(12) United States Patent
Bang

(10) Patent No.: US 12,436,821 B2
(45) Date of Patent: Oct. 7, 2025

(54) VEHICLE, COMPUTING SYSTEM, OPERATING METHOD OF COMPUTING SYSTEM AND COMPUTER PROGRAM

(71) Applicant: LG Energy Solution, Ltd., Seoul (KR)

(72) Inventor: Ji Won Bang, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 0 days.

(21) Appl. No.: 18/574,436

(22) PCT Filed: Dec. 19, 2023

(86) PCT No.: PCT/KR2023/021030
§ 371 (c)(1),
(2) Date: Dec. 27, 2023

(87) PCT Pub. No.: WO2024/225559
PCT Pub. Date: Oct. 31, 2024

(65) Prior Publication Data
US 2025/0103400 A1    Mar. 27, 2025

(30) Foreign Application Priority Data

Apr. 28, 2023 (KR) .................. 10-2023-0056680
Oct. 4, 2023 (KR) .................. 10-2023-0132077
Nov. 6, 2023 (KR) .................. 10-2023-0152151

(51) Int. Cl.
G06F 9/50     (2006.01)
B60L 58/00    (2019.01)
B60L 58/10    (2019.01)
G06F 9/48     (2006.01)

(52) U.S. Cl.
CPC ............ *G06F 9/5094* (2013.01); *B60L 58/00* (2019.02); *B60L 58/10* (2019.02); *G06F 9/48* (2013.01); *G06F 9/4806* (2013.01); *G06F 9/4843* (2013.01); *G06F 9/4881* (2013.01); *G06F 9/4893* (2013.01); *G06F 9/50* (2013.01); *G06F 9/5005* (2013.01)

(58) Field of Classification Search
CPC . G06F 9/48; G06F 9/50; G06F 9/5094; G06F 9/4881; G06F 9/4893; B60L 58/00; B60L 58/10
See application file for complete search history.

(56) References Cited

U.S. PATENT DOCUMENTS

| 2003/0115241 A1 | 6/2003 | Saito et al. |
| 2005/0050544 A1 | 3/2005 | Saito et al. |
| 2009/0132118 A1 | 5/2009 | Takeda |

(Continued)

FOREIGN PATENT DOCUMENTS

| CN | 102126496 A | 7/2011 |
| CN | 105791119 A | 7/2016 |

(Continued)

*Primary Examiner* — Charles M Swift
(74) *Attorney, Agent, or Firm* — Lerner David LLP

(57) ABSTRACT

A vehicle includes a battery and a computing system that analyzes a first calculation related to driving control of the vehicle and a second calculation related to energy management of the vehicle, obtains driving information related to driving of the vehicle, and manages processing of the first calculation and the second calculation based on the driving information.

20 Claims, 13 Drawing Sheets

(56) References Cited

U.S. PATENT DOCUMENTS

| | | | |
|---|---|---|---|
| 2015/0348417 A1* | 12/2015 | Ignaczak | G08B 25/08 |
| | | | 340/435 |
| 2017/0330067 A1* | 11/2017 | Lu | G05D 1/81 |
| 2018/0186230 A1* | 7/2018 | Fukuda | B60W 20/15 |
| 2019/0009790 A1* | 1/2019 | Michalakis | G06F 11/3013 |
| 2020/0070679 A1* | 3/2020 | Wang | B60L 58/21 |
| 2020/0201325 A1 | 6/2020 | Parekh et al. | |
| 2022/0027193 A1* | 1/2022 | Guney | G06F 9/3851 |
| 2022/0116863 A1 | 4/2022 | Nakagawa | |
| 2023/0166593 A1* | 6/2023 | Stadler | G06F 13/128 |
| | | | 726/4 |

FOREIGN PATENT DOCUMENTS

| | | |
|---|---|---|
| EP | 2596977 A1 | 5/2013 |
| JP | 3658420 B2 | 6/2005 |
| JP | 2007-237913 A | 9/2007 |
| JP | 2009-129083 A | 6/2009 |
| JP | 2015229467 A | 12/2015 |
| JP | 2017091214 A | 5/2017 |
| JP | 2020148122 A | 9/2020 |
| JP | 2021-093090 A | 6/2021 |
| JP | 2022063776 A | 4/2022 |
| JP | 7068260 B2 | 5/2022 |
| JP | 7263993 B2 | 4/2023 |
| KR | 100715656 B1 | 5/2007 |
| KR | 20180028421 A | 3/2018 |
| KR | 102811026 B1 | 5/2025 |

\* cited by examiner

VEHICLE, COMPUTING SYSTEM, OPERATING METHOD OF COMPUTING SYSTEM AND COMPUTER PROGRAM

CROSS-REFERENCE TO RELATED APPLICATION(S)

The present application is a national phase entry under 35 U.S.C. § 371 of International Application No. PCT/KR2023/021030 filed Dec. 19, 2023, which claims the benefit of the priority of Korean Patent Application Nos. 10-2023-0152151, filed on Nov. 6, 2023, and 10-2023-0132077, filed on Oct. 4, 2023, and 10-2023-0056680 filed on Apr. 28, 2023 which are hereby incorporated by reference in their entirety.

TECHNICAL FIELD

The disclosure relates to a vehicle, a computing system, an operating method of the computing system, and a computer program.

BACKGROUND ART

As the demand for eco-friendly vehicles increases, electric vehicles (EVs) having batteries such as lithium-ion secondary batteries as energy sources are rapidly replacing conventional internal combustion engine vehicles. In the meantime, as artificial intelligence technologies and various sensor technologies are advanced, research and development for improving the performance of hardware and software related to a vehicle's autonomous driving system are also being actively conducted. Accordingly, the autonomous driving system for supporting autonomous driving of a vehicle has been recently developed or provided in the form of autonomous driving platforms, including various sensors and control units. Some EV makers are mass-producing or developing autonomous driving EVs based on these autonomous driving platforms.

To advance autonomous driving technologies of EVs to reduce or eliminate the emission of greenhouse gasses and thereby mitigate the effects of climate change, vehicle energy management is very important. In this regard, events in which various behaviors and driving scenarios are determined may occur during the autonomous driving of a vehicle. These events are inevitably closely related to energy consumption or energy management. However, a general EV does not have an energy management function, or does not consider an energy management aspect, aside from the calculations related to this energy management function that are generally processed by a battery management system (BMS) provided in a battery itself. However, as the diversification of energy management functions increases and thus more advanced energy management calculations are required, the processing capability of the BMS may reach its limits.

BACKGROUND ART

Technical Problem

Aspects of the disclosure are to address at least the problems and/or disadvantages mentioned herein and to provide at least the advantages described herein. Accordingly, an aspect of the disclosure is to provide a vehicle, a computing system, an operating method thereof, and a computer program that may efficiently process a calculation related to vehicle driving control and/or a calculation related to energy management functions. The energy management functions may facilitate more economical driving by the autonomous driving platform as compared to a conventional autonomous vehicle, which in turn may further improve the overall energy efficiency of the vehicle, thereby leading to reduced energy use. Furthermore, the energy management functions can be implemented in the automated vehicle platforms of many types of vehicles, leading to widespread improvements in energy efficiency.

The technical objectives of embodiments of the disclosure are not limited to the aforementioned problems, and any other technical problems not mentioned herein will be clearly understood from the following description by those skilled in the art to which the disclosure pertains.

Technical Solution

In accordance with an aspect of the disclosure, an autonomous driving platform includes at least one processor operatively coupled to a plurality of sensors and a battery of a vehicle, the at least one processor utilizing calculation resources to perform at least a first calculation related to driving control of the vehicle and a second calculation related to energy management of the vehicle. The at least one processor is configured to obtain driving information related to driving of the vehicle from the plurality of sensors, and to manage an allocation of the calculation resources for performing the first calculation and the second calculation based on the driving information.

According to some embodiments, the at least one processor may be included in the vehicle. According to some embodiments, the calculation resources may be included in the vehicle.

According to some embodiments, the allocation of the calculation resources may be based on a processing priority between the first calculation and the second calculation, and the processing priority between the first calculation and the second calculation may be based on the driving information.

According to some embodiments, the driving information may include vehicle information related to a state of operation of the vehicle and object information related to surrounding objects of the vehicle. The at least one processor may be configured to in response to at least one of overload of the vehicle information or overload of the object information, determine the processing priority such that the first calculation has priority over the second calculation, and in response to an amount of the vehicle information exceeding a threshold amount and an amount of the object information not exceeding the threshold amount, determine the processing priority such that the first calculation and the second calculation have the same priority as each other.

According to some embodiments, the driving information may include vehicle information related to a state of control of the vehicle, and the state of control may include at least a first state of lateral control corresponding to steering the vehicle and a second state of longitudinal control corresponding to acceleration and deceleration of the vehicle According to some embodiments, the at least one processor may be configured to in response to the vehicle being in the first state of lateral control, determine the processing priority such that the first calculation is given a first level of priority, in response to the vehicle being in the second state of longitudinal control, determine the processing priority such that the first calculation is given a second level of priority lower than the first level of priority, in response to the vehicle being in both the first state of lateral control and the second state of longitudinal control, determine the processing priority such that calculation resources are allocated to only the first calculation.

According to some embodiments, the at least one processor may be configured to, in response to the vehicle being in both the first state of lateral control and the second state of longitudinal control, and instruct a data management server operatively connected to the vehicle over a network to perform the second calculation.

According to some embodiments, the processing priority may be based on a reception amount of the driving information over a predetermined period of time and a throughput of the first calculation over the predetermined period of time.

According to some embodiments, allocation of the calculation resources may involve giving priority to the second calculation over the first calculation in response to an empty fuel tank of the vehicle, a destination of the vehicle being set to a charging station, a route of the vehicle being determined at the start of driving, or availability of a driving control software update.

According to some embodiments, the at least one processor may be configured to obtain battery state information related to the battery of the vehicle, determine occurrence of an energy management priority event based on the battery state information, and in response to the energy management priority event, determine the processing priority of the first calculation and the second calculation based on the energy management priority event.

According to some embodiments, the energy management priority event may be one of an abnormal state of the battery state information, or a low battery level of the battery.

According to some embodiments, allocation of the calculation resources may include determination of a calculation priority ratio of the first calculation to the second calculation based on the driving information, and the calculation priority ratio may allocate respective portions of the calculation resources to each of the first calculation and the second calculation.

According to some embodiments, the at least one processor may be configured to obtain battery state information related to the battery of the vehicle, determine occurrence of an energy management priority event based on the battery state information, and in response to the energy management priority event, set the calculation priority ratio to an upper priority ratio value that prioritizes the second calculation over the first calculation by a predetermined maximum amount.

According to some embodiments, the at least one processor may be configured to in response to the calculation priority ratio being less than a priority ratio reference value, allocate at least a portion of the second calculation to a battery management system of the battery, receive a partial second calculation result from the battery management system for the portion of the second calculation, process the second calculation based on the partial second calculation result received from battery the management system.

According to some embodiments, the platform may further comprise the battery, the battery may comprise the battery management system, and the battery management system may be configured to perform the at least a portion of the second calculation and deliver the partial second calculation result to the at least one processor.

According to some embodiments, the battery management system may be operated at least in part remotely such that at least some of the partial second calculation result is received from the remote portion of the battery management system According to some embodiments, the first calculation and the second calculation may be performed in parallel.

According to some embodiments, allocation of the calculation resources may comprise determination of an order of the first calculation and the second calculation based on the driving information, the order determining to which of the first calculation to the second calculation the calculation resources perform first.

According to some embodiments, the at least one processor and calculation resources may be included in a system-on-a-chip, and the autonomous driving platform may further comprise an interface circuit configured to operatively interconnect the at least one processor to one or more of the plurality of sensors of the vehicle.

According to some embodiments, the system-on-a-chip may include only one processing chip.

In accordance with another aspect of the disclosure, an operating method of an autonomous driving platform of a vehicle, the autonomous driving platform including at least one processor within the vehicle having a predetermined amount of calculation resources for performing a first calculation related to driving control of the vehicle and a second calculation related to energy management of the vehicle, the at least one processor operatively coupled to a plurality of sensors and a battery of the vehicle, may include, obtaining driving information related to driving of the vehicle from the plurality of sensors, and managing an allocation of the calculation resources for performing the first calculation and the second calculation based on the driving information.

According to some embodiments, managing the allocation of the calculation resources may be based on a processing priority between the first calculation and the second calculation based on the driving information.

According to some embodiments, the driving information may include vehicle information related to a state of operation of the vehicle and object information related to surrounding objects of the vehicle. The determining of the processing priority may include in response to at least one of overload of the vehicle information or overload of the object information, determine the processing priority such that the first calculation has priority over the second calculation, and in response to an amount of the vehicle information exceeding a threshold amount and an amount of the object information not exceeding the threshold amount, determine the processing priority such that the first calculation and the second calculation have the same priority as each other.

According to some embodiments, the determining of the processing priority may be based on a reception amount of the driving information over a predetermined period of time and a throughput of the first calculation over the predetermined period of time.

According to some embodiments, the managing of the processing may include determining occurrence of an energy management priority event based on the battery state information, and in response to the energy management priority event, determine the processing priority of the first calculation and the second calculation based on the energy management priority event.

According to some embodiments, allocating of the calculation resources may include determining of a calculation priority ratio of the first calculation to the second calculation based on the driving information, and the calculation priority ratio may allocate respective portions of the calculation resources to each of the first calculation and the second calculation.

According to some embodiments, the calculating of the calculation priority ratio may include determining occurrence of an energy management priority event based on the battery state information, and in response to the energy management priority event, setting the calculation priority ratio to an upper priority ratio value that prioritizes the second calculation over the first calculation by a predetermined maximum amount.

According to some embodiments, the managing of the processing may include in response to the calculation priority ratio being less than a priority ratio reference value, allocating at least a portion of the second calculation to a battery management system of the battery, receiving a partial second calculation result from the battery management system for the portion of the second calculation, and processing the second calculation based on the partial second calculation result received from battery the management system.

In accordance with another aspect of the disclosure, when executed by at least one processor, instructions of a computer program stored in a computer-readable medium cause the at least one processor to perform obtaining driving information related to driving of the vehicle from the plurality of sensors, and managing an allocation of the calculation resources for performing the first calculation and the second calculation based on the driving information.

According to some embodiments, managing the allocation of the calculation resources may be based on a processing priority between the first calculation and the second calculation based on the driving information.

According to some embodiments, the driving information may include vehicle information related to a state of operation of the vehicle and object information related to surrounding objects of the vehicle. The determining of the processing priority may include in response to at least one of overload of the vehicle information or overload of the object information, determine the processing priority such that the first calculation has priority over the second calculation, and in response to an amount of the vehicle information exceeding a threshold amount and an amount of the object information not exceeding the threshold amount, determine the processing priority such that the first calculation and the second calculation have the same priority as each other.

According to some embodiments, the determining of the processing priority may be based on a reception amount of the driving information over a predetermined period of time and a throughput of the first calculation over the predetermined period of time.

According to some embodiments, the managing of the processing may include determining occurrence of an energy management priority event based on the battery state information, and in response to the energy management priority event, determine the processing priority of the first calculation and the second calculation based on the energy management priority event.

According to some embodiments, allocating of the calculation resources may include determining of a calculation priority ratio of the first calculation to the second calculation based on the driving information, and the calculation priority ratio may allocate respective portions of the calculation resources to each of the first calculation and the second calculation.

According to some embodiments, the calculating of the calculation priority ratio may include determining occurrence of an energy management priority event based on the battery state information, and in response to the energy management priority event, setting the calculation priority ratio to an upper priority ratio value that prioritizes the second calculation over the first calculation by a predetermined maximum amount.

According to some embodiments, the managing of the processing may include in response to the calculation priority ratio being less than a priority ratio reference value, allocating at least a portion of the second calculation to a battery management system of the battery, receiving a partial second calculation result from the battery management system for the portion of the second calculation, and processing the second calculation based on the partial second calculation result received from battery the management system.

In accordance with another aspect of the disclosure, a vehicle includes a battery and an autonomous driving platform as described in any of the embodiments herein.

Advantageous Effects

According to embodiments disclosed herein, it is possible provide a vehicle, a computing system, an operating method thereof, and a computer program that may efficiently process a calculation related to vehicle driving control and/or a calculation related to an energy management function.

According to embodiments disclosed herein, a calculation related to driving control of the vehicle and a calculation related to energy management of a battery may be efficiently processed through the vehicle's computing system. Accordingly, energy of the vehicle may be efficiently managed.

Technical effects according to the embodiments disclosed herein are not limited to the effects mentioned herein, and other effects not mentioned will be clearly understood by those skilled in the art according to the disclosure of the specification.

MODE FOR INVENTION

Figure 1:
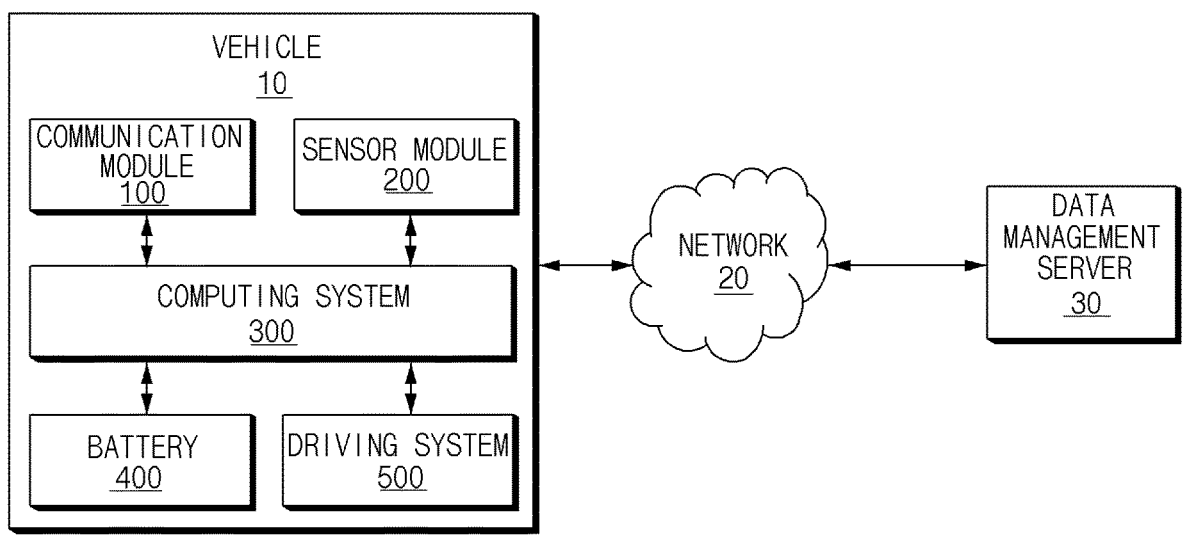
FIG. 1 is a diagram illustrating a vehicle management system, according to some embodiments disclosed herein.

Hereinafter, embodiments of this specification may be described with reference to the accompanying drawings. However, it should be understood that the disclosure of this specification is not intended to limit the specific embodiments, but includes various modifications, equivalents, and/or alternatives of the embodiments described herein.

Embodiments of the disclosure and terms used herein are not intended to limit the technical features described in the disclosure to specific embodiments, and it should be understood that the embodiments and the terms may include modifications, equivalents, or alternatives on the corresponding embodiments described herein. With regard to the descriptions of the drawings, similar or related components may be marked by similar reference marks/numerals. The singular form of the noun corresponding to an item may include one or more of the item, unless interpreted otherwise in context.

In the disclosure, the expressions "A or B", "at least one of A and B", "at least one of A or B", "A, B, or C", "at least one of A, B, and C", and "at least one of A, B, or C" may include any and all combinations of one or more of the associated listed items. The terms, such as "first", "second", "A", "B", "(a)", or "(b)" may be used to simply distinguish the corresponding component from the other component, but do not limit the corresponding components in other aspects (e.g., importance or order) unless specifically stated to the contrary.

In this specification, when a component (e.g., a first component) is referred to as being "coupled with/to" or "connected with/to" another component (e.g., a second component) with or without the term of "operatively" or "communicatively", it may mean that a component is connectable to the other component, directly (e.g., by wire or wirelessly), or indirectly (e.g., through the third component).

A method according to various embodiments disclosed herein may be provided to be included in a computer program product. The computer program product may be traded between a seller and a buyer as a product. The computer program product may be distributed in the form of a machine-readable storage medium (e.g., compact disc read only memory (CD-ROM)) or may be distributed (e.g., downloaded or uploaded), through an application store, directly between two user devices, or online. In the case of on-line distribution, at least part of the computer program product may be at least temporarily stored in the machine-readable storage medium such as the memory of a manufacturer's server, an application store's server, or a relay server or may be generated temporarily.

According to embodiments disclosed herein, each component (e.g., a module or a program) of the components described herein may include a single entity or a plurality of entities, and some of the plurality of objects may be separately arranged on other components. According to embodiments disclosed herein, one or more components of the components or operations described herein may be omitted, or one or more other components or operations may be added. Alternatively or additionally, a plurality of components (e.g., a module or a program) may be integrated into one component. In this case, the integrated component may perform one or more functions of each component of the plurality of components in the manner same as or similar to being performed by the corresponding component of the plurality of components prior to the integration. According to embodiments disclosed herein, operations executed by modules, programs, or other components may be executed by a successive method, a parallel method, a repeated method, or a heuristic method. Alternatively, at least one or more of the operations may be executed in another order or may be omitted, or one or more operations may be added.

FIG. 1 is a diagram illustrating a vehicle management system, according to some embodiments disclosed herein.

Referring to FIG. 1, a vehicle management system 1 may include a vehicle 10, a network 20, and a data management server 30. For example, the vehicle management system 1 may mean a system in which the data management server 30 manages the vehicle 10 by analyzing and/or managing data regarding the vehicle 10 collected through the network 20. The vehicle 10 may include a communication module 100, a sensor module 200, a computing system 300, a battery 400, and a driving system 500. For example, the vehicle 10 may be an EV or hybrid EV (HEV) that generates driving force by using electric energy. Moreover, according to various embodiments, the vehicle 10 may include a vehicle having an autonomous driving function. The communication module 100, the sensor module 200, and the computing system 300 may be implemented in the same form as an autonomous driving platform, but are not limited thereto.

The communication module 100 may exchange data with components outside of the vehicle 10. For example, the communication module 100 may establish a wired and/or wireless communication channel with the network 20 and may exchange various pieces of data with the components outside of the vehicle through the established communication channel. In particular, the communication module 100 may access external devices of the vehicle 10 through the network 20, such as processing and data storage devices included in or connected to the network 20. For instance, the processing and data storage devices may include one or more servers, such as a server in communication with the autonomous vehicle platform, a server in communication with the battery of the vehicle, as well as other servers or any combination thereof.

The sensor module 200 may detect objects positioned around the vehicle 10 and the position of the vehicle itself. For example, the sensor module 200 may include a camera sensor for detecting surrounding objects, a global navigation satellite system (GNSS) sensor for assisting with mapping, perception, occupancy grid creation, and/or route planning functions, a RADAR sensor for detecting surrounding vehicles, an ultrasonic sensor for parking assistance and/or generating an occupancy grid, a LIDAR sensor for detecting objects and pedestrians, emergency braking, collision avoidance, and/or other functions, an inertial measurement unit (IMU) sensor including accelerometers, magnetometers, gyroscopes, and/or magnetic compasses, a vibration sensor, a temperature sensor, and/or a speed sensor.

The computing system 300 may manage the overall operations of the vehicle 10 and functions provided by the vehicle 10, including but not limited to autonomous driving functions and energy management functions. To this end, the computing system 300 may control and/or manage operations of the communication module 100, the sensor module 200, the battery 400, and/or the driving system 500.

The computing system 300 may process various calculations related to the vehicle 10 and may execute programs, software, or instructions. According to some embodiments, the computing system 300 may process a calculation related to driving control of the vehicle 10 and/or a calculation related to an energy management function. For example, the calculation related to driving control of the vehicle 10 may include calculations for determining a driving strategy, a driving route, and a behavior of the vehicle 10.

The computing system 300 may process calculations related to driving control of the vehicle 10 and/or calculations related to energy management functions based on driving information of the vehicle 10 and/or state information of the battery 400. According to some embodiments, the computing system 300 may process calculations related to driving control of the vehicle 10 and calculations related to energy management functions depending on the processing priority of the calculation related to the driving control of the vehicle 10 and the calculation related to the energy management function, which are determined based on the driving information of the vehicle 10 and/or the state information of the battery 400. Accordingly, the computing system 300 may timely and efficiently process various calculations depending on driving situations of the vehicle 10. This will be described in detail herein.

The computing system 300 may include at least one processor for processing calculations and executing instructions, and an interface circuit for interacting with other elements of the vehicle 10. According to some embodiments, a communication method of the interface circuit may be an inter-device communication method such as a bus, general purpose input and output (GPIO), serial peripheral interface (SPI), mobile industry processor interface (MIPI), and the like.

The at least one processor of the computing system 300 may have a structure for executing instructions implementing processes processed inside the vehicle 10. The at least one processor may be implemented as an array of logic gates for processing various calculations or a general-purpose microprocessor and may be composed of a single processor or a plurality of processors. For example, the at least one processor may be implemented in the form of a microprocessor, CPU, GPU, AP, or a combination thereof.

At least one processor of the computing system 300 may be configured separately from or integrally with a memory (not shown) configured to store instructions, and may process various calculations by executing the instructions stored in the memory. The memory may store various pieces of data, instructions, mobile applications, computer programs, and the like. For example, the memory may be implemented with a non-volatile memory such as ROM, PROM, EPROM, EEPROM, flash memory, PRAM, MRAM, RRAM, FRAM, or the like or a volatile memory such as DRAM, SRAM, SDRAM, or the like and may be implemented in a form of HDD, SSD, SD, Micro-SD, or the like, or a combination thereof.

The battery 400 may supply power and/or electrical energy to the vehicle 10. For example, the battery 400 may be a rechargeable secondary battery, which is discharged while supplying power to the vehicle 10 and which is charged by a battery charging device, and, for example, may be a lithium-ion battery, but is not limited thereto. According to some embodiments, the battery 400 may include battery cells, battery modules, battery packs, and/or battery racks, and may include a BMS for managing battery cells, modules, and packs.

The BMS may manage the overall operations and functions of the battery 400. According to some embodiments, the BMS may process calculations related to energy management functions. In some cases, the BMS may provide the computing system 300 with the processing result of a calculation. The BMS may be a part of the vehicle. In some examples, the BMS may be entirely within the vehicle, such as being included in the battery 400. In other examples, the BMS may be fully or partially remote from the vehicle. For instance, the battery management functions of the BMS may be handled by a distributed computing network or cloud network of calculation resources.

The driving system 500 may control driving and/or behavior of the vehicle 10. For example, it is possible to control an operation of an actuator related to the braking, driving, and position of the vehicle 10. According to some embodiments, the driving system 500 may include a braking system that controls an operation of a braking-related actuator, a position control system that controls an operation of an actuator for stably maintaining the position of a vehicle body, a steering system that controls an operation of an actuator for controlling a vehicle's lateral behavior, a shifting system that controls an operation of an actuator for automatic shifting, and/or an engine management system that controls an operation of an actuator for controlling the vehicle's driving speed, but is not limited thereto.

According to some embodiments, the driving system 500 may control driving and/or behavior of the vehicle 10 in response to a control command of the computing system 300. For example, the driving system 500 may control the driving and/or behavior of the vehicle 10 in response to the control command based on the calculation result (e.g., the calculation/execution result of autonomous driving software) of the computing system 300.

The network 20 may mean a data communication network for supporting communication between the vehicle 10 and the data management server 30. For example, the network 20 may include a wired network, a wireless network, or a combination thereof, but is not limited thereto, and may be a different type of a network capable of supporting data exchange. According to some embodiments, the wired network may include a local area or wide area Internet that supports the TCP/IP protocol. The wireless network may include a base station-based wireless communication network, a satellite communication network, a local area wireless communication network such as Wi-Fi, or a combination thereof.

According to some embodiments, the network 20 may include cellular networks such as 2G to 5G networks and future network generations, LTE networks, Global System for Mobile communication (GSM) networks, Code Division Multiple Accesses (CDMA) networks, Evolution-Data Optimization (EVDO) networks, Public Land Mobile networks, and/or other networks. According to some embodiments, the network 20 may include a local area network (LAN), wireless local area network (WLAN), Wide Area Network, Metropolitan Network (MAN), Public Switched Telephone Network (PSTN), ad hoc network, managed IP network, Virtual Private Network, intranet, Internet, optical-fiber-based network, and/or a combination thereof, or other types of networks.

According to various embodiments, the data management server 30 may include a communication module, a processor, a database, and the like. The data management server 30 may obtain vehicle information from the vehicle 10 through the communication module. For example, the vehicle information may include driving information related to the driving of the vehicle 10 and/or battery state information related to the state of the battery 400. The data management server 30 may record the vehicle information provided from the vehicle 10 in a database. The data management server 30 may include a central processing unit (CPU), an application processor (AP), a graphics processing unit (GPU), a neural network processing unit (NPU), an image signal processor, and the like and may perform various data processing or calculations.

According to some embodiments, the data management server 30 may support updates of the autonomous driving platform's software installed in the vehicle 10, updates of battery management software, updates of navigation maps, or the like, and may store driving information, battery state information, or black box image data that is provided from the vehicle 10 during a specific period. Besides, the data management server 30 may be configured to perform various functions related to processing, management, and storage of information or data related to the vehicle 10.

Figure 2:
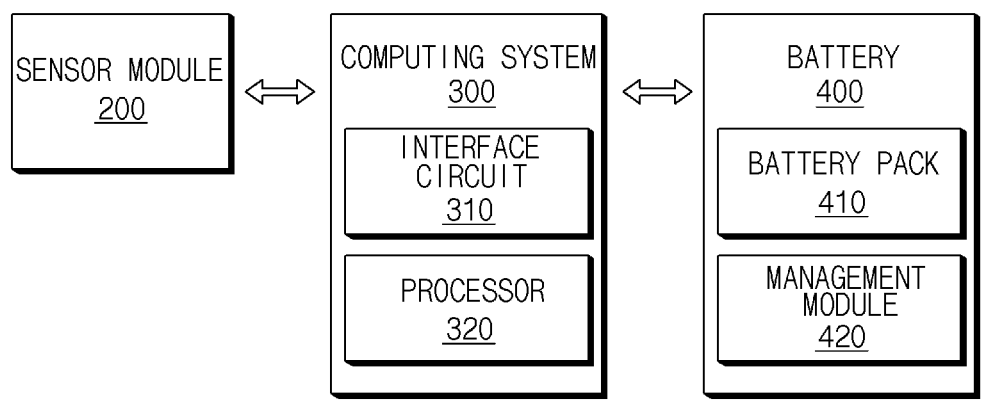
FIG. 2 is a diagram illustrating a process in which driving control and energy management are performed in a vehicle, according to some embodiments disclosed herein.

FIG. 2 is a diagram illustrating a process in which driving control and energy management are performed in a vehicle, according to some embodiments disclosed herein.

Referring to FIG. 2, the computing system 300 may process a calculation related to driving control of the vehicle 10 and/or a calculation related to an energy management function. To this end, the computing system 300 may receive data corresponding to driving information and/or data corresponding to battery state information from the communication module 100, the sensor module 200, and/or the battery 400. According to some embodiments, the first computing system 300 may correspond to an autonomous driving platform.

According to some embodiments, driving control for vehicle 10 may include controlling driving-related variables such as a location of the vehicle, speed, acceleration, driving direction, revolutions per minute (RPM) of an engine/motor, a transmission ratio, suspension damping, and a regenerative braking level of the vehicle 10 based on the driving information related to driving of the vehicle 10. For example, the driving information may include object information about surrounding objects of the vehicle 10 and behavior information about the behavior of the vehicle 10. The object information may include the type and number of surrounding objects, a distance to the vehicle 10, a relative location of the vehicle 10, a ground location, a relative speed, a ground speed, a relative acceleration, a ground acceleration, or the like. The behavior information may include a location of the vehicle 10, a moving path, a traveling distance, a speed, an acceleration, a steering angle, yaw, pitch, roll, or the like. According to some embodiments, the driving control may include controlling the acceleration, deceleration, and steering for autonomous driving of the vehicle 10, and a combination thereof.

According to some embodiments, the energy management function performed for the vehicle 10 may include diagnosing the state of the battery 400, predicting life span of the battery 400, controlling an operation (e.g., cell balancing) of the battery 400, generating and/or providing a charging guide of the battery 400, and the like based on the driving information of the vehicle 10 and/or the battery state information provided from the battery 400. For example, the battery state information may include voltage information, current information, temperature information, state-of-charge (SOC) information, state-of-health (SOH) information, and a combination thereof, and may further include an accumulated charge current amount, an accumulated discharge current amount, an accumulated charge power amount, an accumulated discharge power amount, insulation resistance, a relay state, and the like.

According to some embodiments, the computing system 300 may execute driving control software that determines and implements the driving controls of the vehicle 10. For example, the driving control software may determine driving controls, including the acceleration, deceleration, and steering for autonomous driving of the vehicle 10 and a combination thereof based on the driving information provided from the communication module 100 and/or the sensor module 200. The driving control software may instruct the driving system 500 to execute the determined driving controls. Moreover, the driving control software may determine driving controls for execution by the driving system 500 including the acceleration, deceleration, and steering for autonomous driving of the vehicle 10 and a combination thereof in further consideration of the battery state information provided from the battery 400.

According to some embodiments, the computing system 300 may execute energy management software in addition to the driving control software. For example, the computing system 300 may execute the driving control software and the energy management software alternately or simultaneously. According to some embodiments, the computing system 300 may execute the energy management software based on the battery state information provided from a management module 420 of the battery 400. In some embodiments, the management module 420 may be, or may be included in, a battery management system of the battery 400. In this regard, the management module 420 may include hardware components such as one or more processors and/or memory, software such as program instructions for executing management software such as the energy management software, or a combination thereof. The management functions of the energy management software may include a function for diagnosing the state of the battery 400, predicting life span of the battery 400, controlling an operation (e.g., cell balancing) of the battery 400, generating and/or providing a charging guide of the battery 400, and the like. According to some embodiments, the management module 420 may measure voltage, current, temperature, or the like from a battery pack 410, and may estimate SOC, SOH, or the like. The battery pack 410 may include a plurality of battery modules, and each of the battery modules may include a plurality of battery cells.

In a case of a general EV, a controller of a vehicle processes only calculations related to driving control, and the battery management module processes calculations related to energy management functions. On the other hand, the computing system 300 may be configured to process both calculations related to driving control and calculations related to energy management functions. According to this method, compared to the management module 420 of the battery 400, the computing system 300 has relatively higher calculation processing capabilities and may perform energy management functions. As such, the computing system can stably and smoothly performing energy management of the vehicle 10.

Furthermore, some of the calculations related to energy management functions of the vehicle 10 may be processed by the computing system 300, and the other calculations may be processed by the management module 420 of the battery 400. As such, stable and smooth energy management of the vehicle 10 may be achieved by distributing calculations related to the energy management function between the computing system 300 and the battery 400. In addition, it may be possible to lower the specification of the management module 420 provided in the battery 400, such as the processing requirements of the management module 420, energy requirements of the management module 420, or both.

Figure 3:
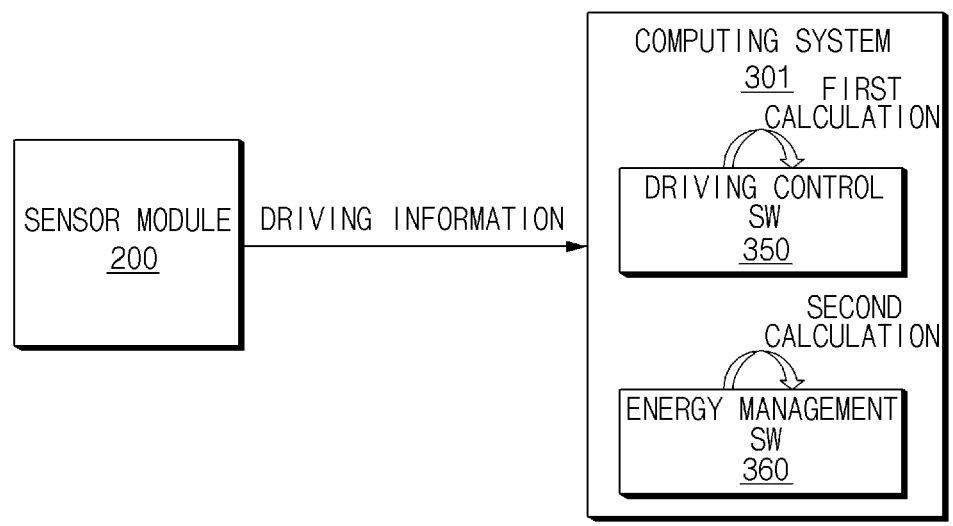
FIG. 3 is a diagram illustrating a first computing system, according to some embodiments disclosed herein.

FIG. 3 is a diagram illustrating a first computing system, according to some embodiments disclosed herein.

Referring to FIG. 3, a method in which a first computing system 301 within the vehicle 10 manages a first calculation related to driving control and a second calculation related to energy management based on driving information provided from the sensor module 200 is illustrated. According to some embodiments, the first computing system 301 may correspond to an autonomous driving platform.

According to some embodiments, the first computing system 301 may include an interface circuit 310 and at least one processor 320 operatively coupled to the interface circuit 310. However, other embodiments are not limited thereto. Some elements may be omitted from the first computing system 301 or other general-purpose elements may be further included in the first computing system 301.

Hereafter, functions and/or operations performed by the at least one processor 320 may be interpreted as being performed by the first computing system 301 in the vehicle 10.

The at least one processor 320 of the first computing system 301 may be configured to analyze the first calculation related to driving control of the vehicle 10 and the second calculation related to energy management of the vehicle 10. According to some embodiments, the at least one processor 320 of the first computing system 301 may process the first calculation related to driving control of the vehicle 10 by executing driving control software 350, and may process the second calculation related to energy management of the vehicle 10 by executing energy management software 360. As described herein, the first calculation and the second calculation may be processed alternately or simultaneously. To this end, the first calculation and the second calculation may be analyzed. According to some embodiments, the analysis of the first calculation and the second calculation may include a calculation amount comparison, a calculation time comparison, analysis of whether urgency is present, and the like.

The at least one processor 320 of the first computing system 301 may be configured to obtain driving information related to driving of the vehicle 10. According to some embodiments, the driving information related to driving of the vehicle 10 may be obtained through the sensor module 200. According to some embodiments, the driving information may include object information and behavior information; the object information may include the type and number of surrounding objects, a distance to the vehicle 10, a location of the vehicle 10, a ground location, a relative speed, a ground speed, a relative acceleration, a ground acceleration, or the like; and the behavior information may include a location of the vehicle 10, a moving path, a traveling distance, a speed, an acceleration, a steering angle, yaw, pitch, roll, or the like.

The at least one processor 320 of the first computing system 301 may be configured to manage the processing of the first calculation and the second calculation based on the driving information. According to some embodiments, when the processing of the first calculation and the second calculation is managed, the first calculation or the second calculation may be processed first, and then the other thereof may be processed, or the first calculation and the second calculation may be simultaneously processed in parallel. For a method of alternately or sequentially processing the first calculation and second calculation, the processing priority between the first calculation and the second calculation may involve an order in which the first calculation and second calculation are executed. For a method of simultaneously processing the first calculation and the second calculation in parallel, meaning that processing of the second calculation begins before processing of the first calculation is completed, the processing priority between the first calculation and the second calculation may involve a ratio of calculation resources that are allocated to each of the first calculation and the second calculation. It should be further recognized that allocation of computing resources may be performed according to both order and a ratio, such as by assigning a certain ratio of resources at a start time and adjusting the ratio over time, or by starting one of the first and second calculations before the other, and subsequently allocating calculation resources to both calculations.

According to some embodiments, the at least one processor 320 of the first computing system 301 may be configured to determine the processing priority between the first calculation and the second calculation based on the driving information and to process the first calculation and the second calculation depending on the processing priority. When the vehicle 10 performs both the driving control and the energy management, the driving information may be preferentially referred to determine the processing order or throughput of both. The battery state information may be additionally considered as needed.

According to some embodiments, while autonomous driving of the vehicle 10 is performed, the first calculation related to driving control may have a higher processing priority or processing priority ratio than the second calculation related to energy management. For example, while the vehicle 10 is autonomously driving, after the first calculation is completely processed, the second calculation may be processed at every processing cycle of 0.1 sec, 0.2 sec, 0.3 sec, 0.5 sec, 1.0 sec, or the like, or the first calculation and the second calculation may be simultaneously processed at a ratio of 99:1, 98:2, 95:5, 90:10, 85:15, or the like according to the processing priority ratio.

Figure 4:
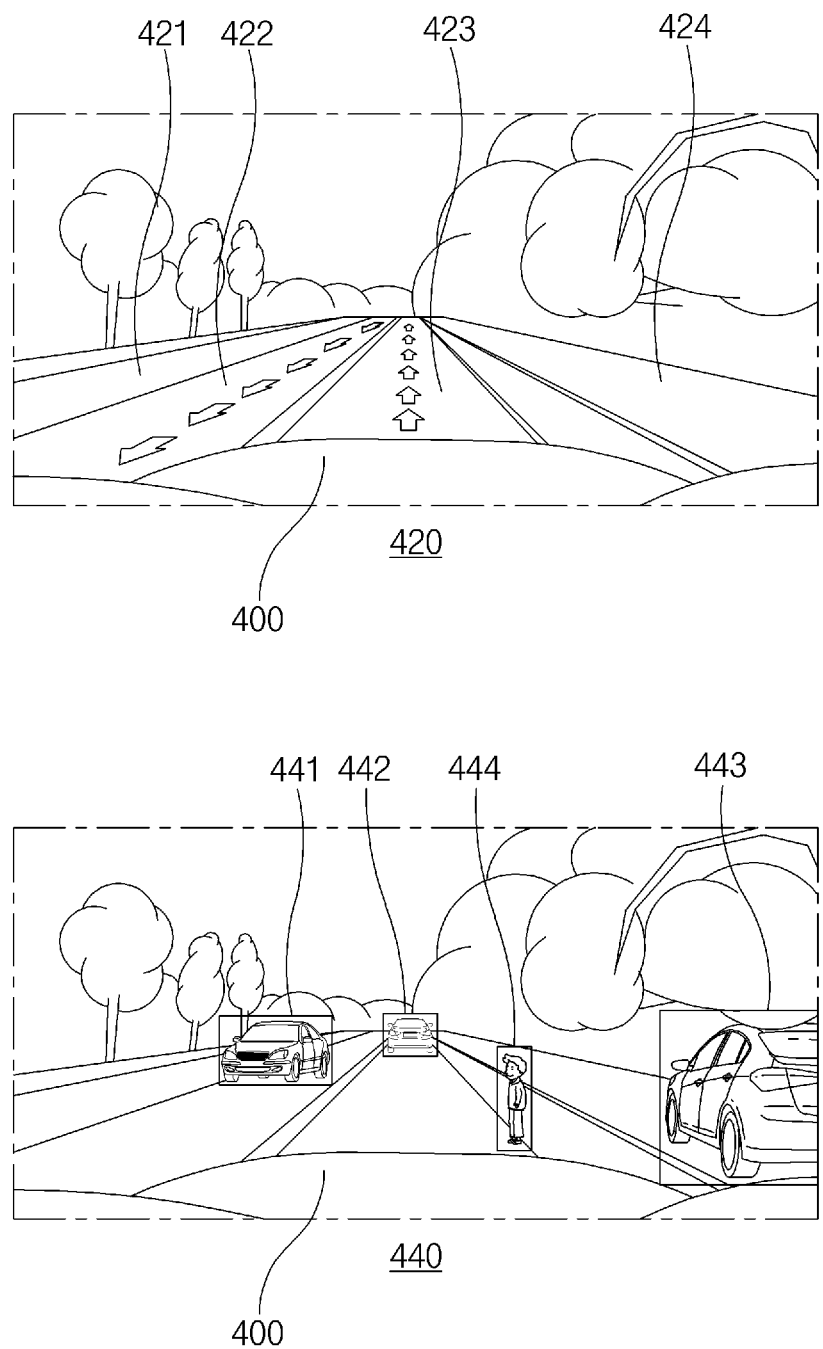
FIG. 4 is a diagram for illustrating a process of determining a processing priority in a first computing system, according to some embodiments disclosed herein.

FIG. 4 is a diagram illustrating a process of determining a processing priority in a first computing system, according to some embodiments disclosed herein.

Referring to FIG. 4, a driving environment 420 and a driving environment 440 of the vehicle 10 may be shown. The driving environment 420 may include surrounding objects 421, 422, 423, and 424 of the vehicle 10, and the driving environment 440 may include surrounding objects 441, 442, 443, and 444 of the vehicle 10.

In the driving environment 420, the surrounding objects 421, 422, 423, and 424 may mean a shoulder, a sidewalk, a driving lane, an oncoming lane, and the like. In the driving environment 440, the surrounding objects 441, 442, 443, and 444 may mean a pedestrian, a stationary vehicle, a driving vehicle, an oncoming vehicle, and the like. Surrounding objects in the driving environment 420 and the driving environment 440 may be detected by generating sensor data in the sensor module 200 and processing sensor data in the computing system 300, and information related to the surrounding objects may form object information.

According to some embodiments, the driving information may include behavior information related to the behavior of the vehicle 10 and object information related to surrounding objects of the vehicle 10. When at least one of overload of the behavior information and overload of object information occurs, the at least one processor 320 of the computing system 301 may determine processing priority such that the first calculation takes precedence over the second calculation. One example of overload of the behavior information may be based on a measurement of an input into the computing system 301, such as an amount of input data of the driving information exceeding a threshold within a given amount of time, such as exceeding a threshold number of data points or a threshold amount of space required to store the input data within a certain number of seconds or a certain number of processing cycles of the computing system 301. Another example of overload of the behavior information may be based on an output from the computing system, such as a measure of latency exceeding a threshold, such as a threshold amount of time or a threshold percentage of calculations being delayed. When the overload of the behavior information and the overload of object information do not occur, the at least one processor 320 of the computing system 301 may determine that the first calculation and the second calculation have the same processing priority as each other.

For example, the overload of behavior information may include a case where there is an excessive amount of behavior information in a situation where the changes in velocity of the vehicle 10, which may be due to acceleration, deceleration and/or steering of the vehicle 10, has a high frequency and a great change amount. The overload of object information may include a case where the surrounding objects 441, 442, 443, and 444 and the number, type, and movement of the surrounding objects 421, 422, 423, and 424 are numerous and complicated. In such the overload situation of behavior information or object information, it may be desirable to stably perform driving control by prioritizing the first calculation over the second calculation.

According to some embodiments, the vehicle 10 needs to determine a driving strategy in real time depending on the number, shapes, locations, or speeds of objects recognized during driving control. The calculation amount of the first calculation related to driving control may vary depending on the amount of driving information. Accordingly, in a case where the number of surrounding objects is less than a specific number, or a case where it is determined that there is no effect on the driving of the vehicle 10 in consideration of locations or speeds of surrounding objects, energy management may take precedence over driving control.

According to some embodiments, the first calculation may be preferentially processed for a lateral control expected to require a large calculation amount by distinguishing a longitudinal control corresponding to acceleration or deceleration from the lateral control corresponding to heading or steering among driving controls of the vehicle 10. Conversely, for the longitudinal control, the priority of first calculation may be lowered relatively.

According to some embodiments, when the driving control software 350 is busy such that the calculation amount of the driving control software 350 is very large as in a case where both the longitudinal control and the lateral control are needed, and/or the types and number of surrounding objects are numerous and complicated, the first computing system 301 may mainly process the first calculation with a higher level of priority than a level of priority when the driving control software 350 is not busy, or only process the first calculation. If the first calculation is mainly or only processed, at least a portion of the second calculation may not be processed by the first computing system 301, and after the second calculation is processed by the management module 420 of the battery 400 or the data management server 30, the result may be delivered to the first computing system 301. Stated another way, the calculations described in the present disclosure as being performed at the management module 420 may additionally or alternatively be performed outside of the management module such as at a server or other processing component communicatively connected to the management module 420 or vehicle 10.

According to some embodiments, the at least one processor 320 of the first computing system 301 may be configured to determine the processing priority based on a periodic reception amount of driving information and periodic throughput of the first calculation. The period for which the processing priority is determined may vary between different computing systems depending on the amount of input data typically received, the type of calculations being performed, and the amount of processing components available for the calculations, as well as other factors. For example, when the hourly reception amount (reception speed) of driving information provided from the sensor module 200 exceeds a threshold reception amount, it may be expected that the time required to process the driving information in the first computing system 301 increases, and thus the processing priority may be determined such that the first calculation takes precedence over the second calculation. In the meantime, the hourly throughput (processing speed) of the first calculation may vary depending on the complexity of the driving information. When the hourly throughput of the first calculation exceeds a threshold throughput, the processing priority may be determined such that the first calculation takes precedence over the second calculation.

According to some embodiments, the at least one processor 320 of the first computing system 301 may determine whether a priority event of energy management occurs, based on battery state information related to the battery 400 of the vehicle 10. When it is determined that the priority event occurs, the at least one processor 320 of the first computing system 301 may be configured to process a calculation corresponding to the priority event, and then to process the first calculation and the second calculation depending on the processing priority.

For example, when an abnormality is detected in the battery state information, or it is determined that it is necessary to perform energy management before driving control to maintain and manage the battery 400, it may be determined that a priority event of energy management occurs. When the priority event occurs, the calculation corresponding to the priority event may be processed preferentially. Afterward, the first calculation and the second calculation may be processed again depending on the processing priority.

According to some embodiments, in a process of setting a route after a destination is entered at a stage where the vehicle 10 starts driving, energy management such as battery state diagnosis or remaining power detection may be first performed to exclude routes incapable of being completed by reflecting SOC and/or SOH of the battery 400. According to some embodiments, when the vehicle 10 starts driving or when a charging station is set as a destination, energy management may take precedence over driving control to provide a charging guide for the battery 400. In the case, the charging guide may be determined based on past charging patterns and battery deterioration. According to some embodiments, when an update of the driving control software 350 is in progress or scheduled, energy management may be first performed to ensure the remaining battery power for the completion of the update.

Figure 5:
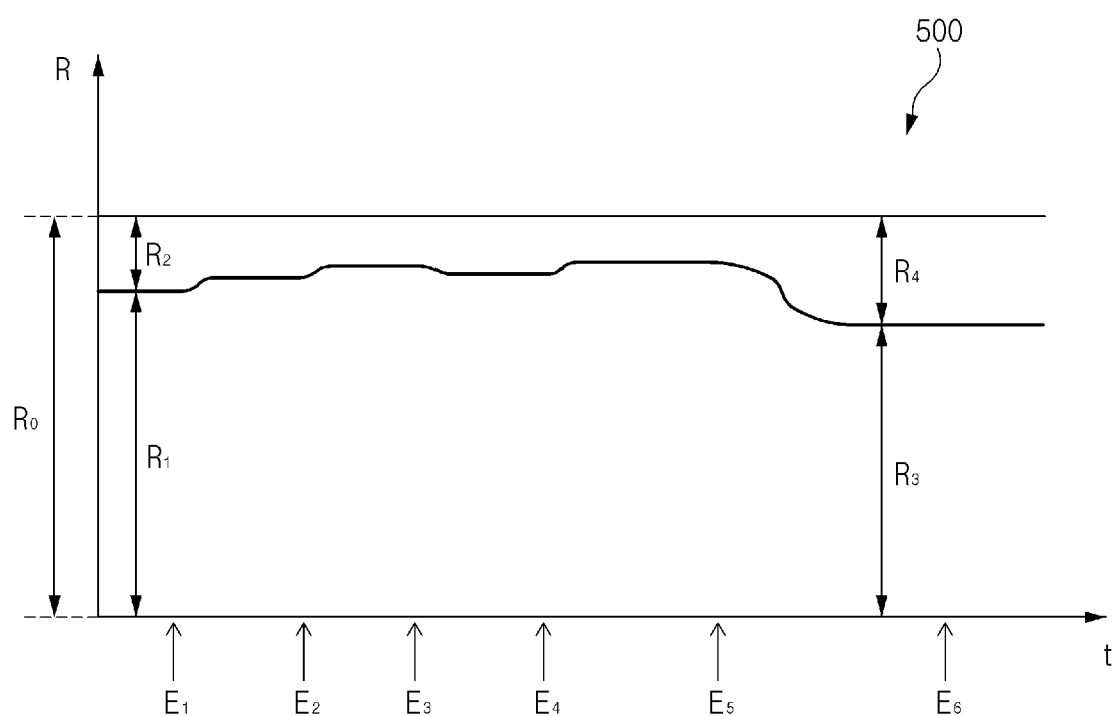
FIG. 5 is a diagram illustrating a process of calculating a processing priority ratio in a first computing system, according to some embodiments disclosed herein.

FIG. 5 is a diagram illustrating a process of calculating a processing priority ratio in a first computing system, according to some embodiments disclosed herein.

Referring to FIG. 5, a graph 500 illustrating a process of calculating a processing priority ratio in the first computing system 301 may be shown. The graph 500 may indicate a distribution structure of calculation resources 'R' over time 't'.

According to some embodiments, the at least one processor 320 of the first computing system 301 may be configured to calculate a calculation priority ratio of a first calculation to a second calculation based on driving information, and to simultaneously process the first calculation and the second calculation by distributing calculation resources based on the calculation priority ratio. Calculation resources may include, but are not limited to, any one or combination of processing resources or memory resources included in the computing system that can be used to perform the first and second calculations described herein. For example, the calculation resources may be a number of CPUs or a number of cores allocated for a particular operation, a number of instructions or a number of threads of instructions executed to perform a particular operation, an amount of memory space or number of memory devices reserved for a particular operation, a rate of processing cycles at which the particular operation is performed, and so on.

In the graph 500, calculation resources $R_0$ may mean the total sum of calculation resources of the first computing system 301. The calculation resources $R_0$ may be distributed to a first resource $R_1$ for processing the first calculation related to driving control and a second resource $R_2$ for processing the second calculation related to energy management. According to some embodiments, whenever events $E_1, \ldots, E_5$ related to driving or battery of the vehicle 10 occur, the distribution of the calculation resources $R_0$ may vary.

According to some embodiments, the at least one processor 320 of the first computing system 301 may determine whether a priority event of energy management occurs, based on battery state information related to the battery 400 of the vehicle 10. When it is determined that the priority event occurs, the at least one processor 320 of the first computing system 301 may be configured to set an upper priority ratio value based on characteristics of a priority event and to calculate the calculation priority ratio again in consideration of the upper priority ratio value.

According to some embodiments, in the graph 500, the event $E_5$ may be a priority event of energy management. For example, the priority event may include a situation in which an abnormal state of battery state information occurs, a situation in which a battery level is low and fuel is empty, a situation in which a destination is set to a charging station, a situation in which driving control software is scheduled to be updated, or the like. The upper priority ratio value may be set to $R_3/R_0$. Accordingly, after the event $E_5$, even though weight $R_4/R^0$ of the second calculation is reduced, and the event $E_6$ that needs to increase weight $R_3/R_0$ of the first calculation occurs, a ratio $(R_3:R_4)$ between the first calculation and the second calculation may not change because the upper priority ratio value is limited.

According to some embodiments, the at least one processor 320 of the first computing system 301 may be configured to deliver at least part of the second calculation to the management module 420 of the battery 400 when the calculation priority ratio is set to be less than the priority ratio reference value, and to process all of the second calculation based on the calculation result for at least part of the second calculation provided from the management module 420.

The priority ratio reference value may be preset to a numerical value such as 0.5%, 1.0%, 2.0%, or 5.0%. As mentioned herein, when the calculation priority ratio of the first calculation for the second calculation is less than the priority ratio reference value in an overload situation of behavior information or object information, it may be difficult to process the second calculation without delay by using only calculation resource $R_2/R_0$ allocated to energy management. In this case, to supplement insufficient calculation resources, the calculation resource of the management module 420 of the battery 400 may be utilized. The result for at least part of the second calculation processed by the management module 420 may be delivered to the first computing system 301, and the second calculation may be completed based on the result.

Figure 6:
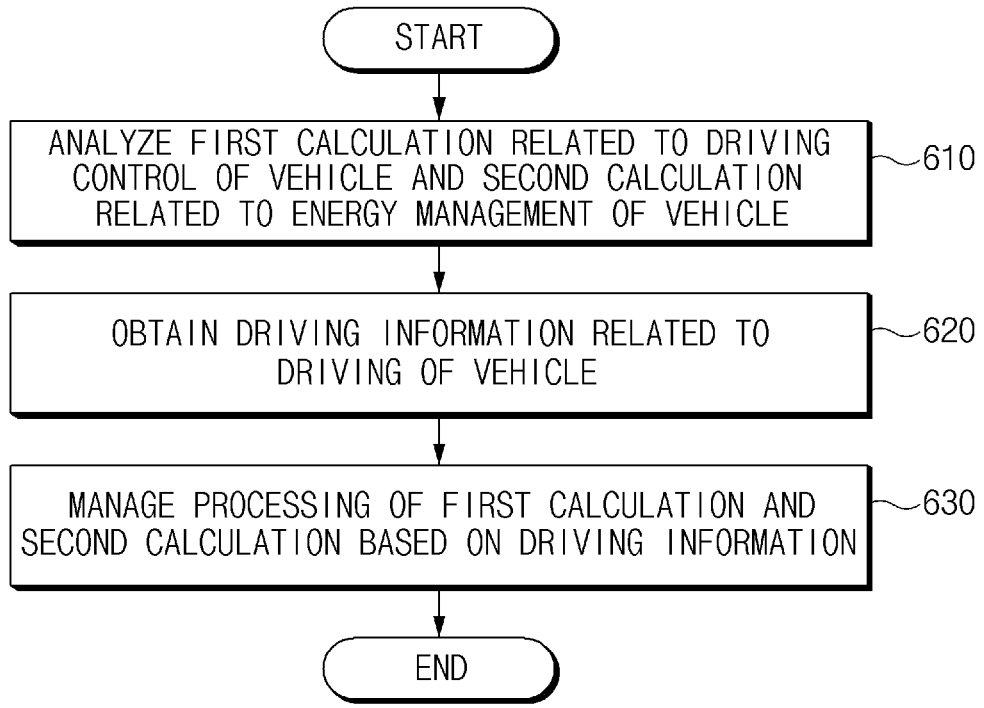
FIG. 6 is a diagram illustrating operations constituting an operating method of a first computing system, according to some embodiments disclosed herein.

FIG. 6 is a diagram illustrating operations constituting an operating method of a first computing system, according to some embodiments disclosed herein.

Referring to FIG. 6, an operating method 600 of the first computing system 301 may include operation 610 to operation 630. However, some embodiments is not limited thereto, and it is possible to omit some operations or add general-purpose operations. The operations of the operating method 600 may be performed in a different order than the shown order.

Operation 610 to operation 630 of the operating method 600 may be performed by the at least one processor 320 operatively coupled to the interface circuit 310. The operating method 600 of the first computing system 301 may include operations processed in time series in the first computing system 301. Accordingly, even where contents are omitted, descriptions of the first computing system 301 may be identically applied to the operating method 600.

In operation 610, the first computing system 301 may analyze a first calculation related to driving control of a vehicle and a second calculation related to energy management of the vehicle. In operation 620, the first computing system 301 may obtain driving information related to driving of the vehicle. In operation 630, the first computing system 301 may manage the processing of the first calculation and the second calculation based on the driving information.

According to some embodiments, the operating method 600 of the first computing system 301 may be implemented in a form of a computer program stored in a computer-readable storage medium. That is, the computer program may include instructions for implementing the operating method 600 of the first computing system 301, and the instructions of the program may be stored in a computer-readable storage medium. The computer program may include a mobile application.

For example, the computer-readable storage medium may include a hardware system, which is specially configured to store and execute computer program instructions, such as magnetic media (e.g., a hard disk, a floppy disk, or a magnetic tape), optical media (e.g., CD-ROM and DVD), magneto-optical media (e.g., a floptical disk), read only memories (ROMs), random access memories (RAMs), and flash memories. Also, the computer program instructions may include not only a mechanical code such generated by a compiler but also a high-level language code executable on a computer by using an interpreter.

Figure 7:
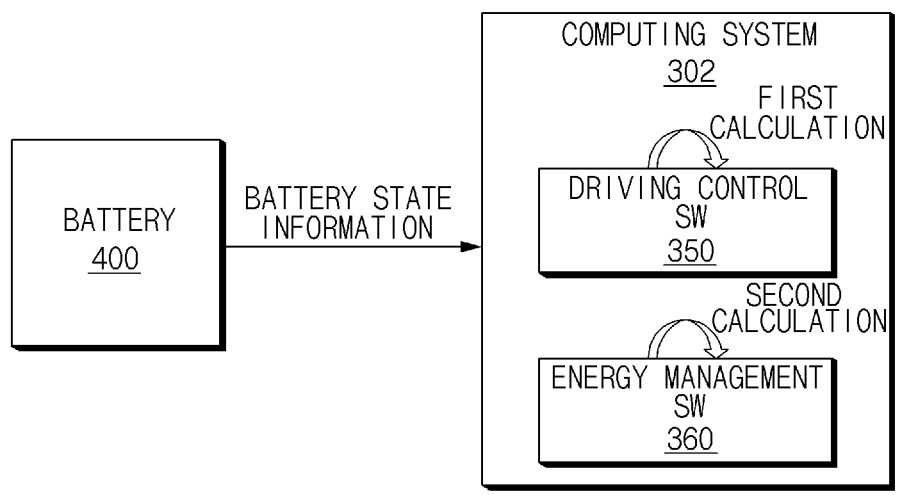
FIG. 7 is a diagram illustrating a second computing system, according to some embodiments disclosed herein.

FIG. 7 is a diagram illustrating a second computing system, according to some embodiments disclosed herein.

Referring to FIG. 7, a method in which a second computing system 302 within the vehicle 10 manages a first calculation related to driving control and a second calculation related to energy management based on battery state information provided from the battery 400 may be illustrated. According to some embodiments, the second computing system 302 may correspond to an autonomous driving platform.

According to some embodiments, the second computing system 302 may include an interface circuit 310 and at least one processor 320 operatively coupled to the interface circuit 310. However, some embodiments is not limited thereto. Some elements may be omitted from the second computing system 302 or other general-purpose elements may be further included in the second computing system 302.

Hereafter, functions and/or operations performed by the at least one processor 320 may be interpreted as being performed by the second computing system 302 in the vehicle 10.

The at least one processor 320 of the second computing system 302 may be configured to analyze the first calculation related to driving control of the vehicle 10 and the second calculation related to energy management of the vehicle 10. According to some embodiments, the at least one processor 320 of the second computing system 302 may process the first calculation related to driving control of the vehicle 10 by executing driving control software 350, and may process the second calculation related to energy management of the vehicle 10 by executing energy management software 360. As described herein, the first calculation and the second calculation may be processed alternately or simultaneously. To this end, the first calculation and the second calculation may be analyzed. According to some embodiments, the analysis of the first calculation and the second calculation may include a calculation amount comparison, a calculation time comparison, analysis of whether urgency is present, and the like.

The at least one processor 320 of the second computing system 302 may be configured to obtain battery state information related to the battery 400 of the vehicle 10. According to some embodiments, the battery state information may include voltage information, current information, temperature information, SOC information, SOH information, an accumulated charge current amount, an accumulated discharge current amount, an accumulated charge power amount, an accumulated discharge power amount, insulation resistance, a relay state, and a combination thereof.

The at least one processor 320 of the second computing system 302 may be configured to manage the processing of the first calculation and the second calculation based on the battery state information. According to some embodiments, when the processing of the first calculation and the second calculation is managed, the first calculation or the second calculation may be processed first, and then the other thereof may be processed, or the first calculation and the second calculation may be simultaneously processed in parallel. For a method of alternately processing the first calculation and second calculation, the processing priority between the first calculation and the second calculation may be determined. For a method of simultaneously processing the first calculation and the second calculation in parallel, a processing priority ratio between the first calculation and the second calculation may be determined.

According to some embodiments, the at least one processor 320 of the second computing system 302 may be configured to determine the processing priority between the first calculation and the second calculation based on the battery state information and to process the first calculation and the second calculation depending on the processing priority. When the vehicle 10 performs both the driving control and the energy management, the battery state information may be preferentially referred to determine the processing order or throughput of both. The driving information may be additionally considered as needed.

According to some embodiments, while autonomous driving of the vehicle 10 is not performed (e.g., while the vehicle 10 is stopped), the second calculation related to energy management may have a processing priority or processing priority ratio, which is the same as or higher than the first calculation related to driving control. For example, while the vehicle 10 is stopped to wait for a traffic light, after the second calculation is completely processed, the first calculation may be processed at every processing cycle of 0.1 sec, 0.2 sec, 0.3 sec, 0.5 sec, 1.0 sec, or the like, or the first calculation and the second calculation may be simultaneously processed at a ratio of 90:10, 85:15, 80:20, 75:25, 70:30, 65:35, or the like according to the processing priority ratio.

Figure 8:
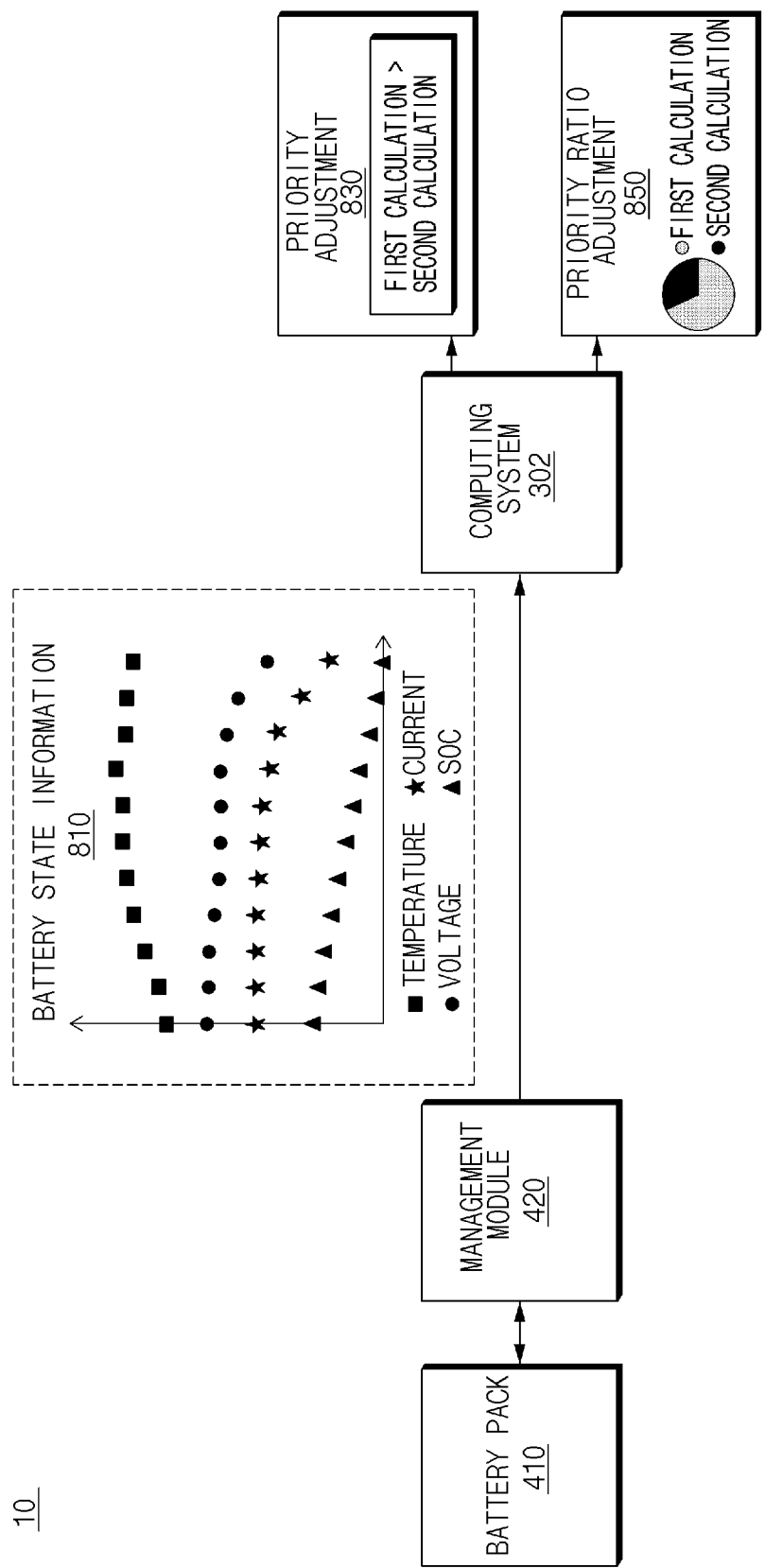
FIG. 8 is a diagram illustrating a method of utilizing battery state information in a second computing system, according to some embodiments disclosed herein.

FIG. 8 is a diagram illustrating a method of utilizing battery state information in a second computing system, according to some embodiments disclosed herein.

Referring to FIG. 8, a process of generating battery state information 810 through the management module 420 in the vehicle 10 and performing priority adjustment 830 or priority ratio adjustment 850 on a first calculation and a second calculation by using the battery state information 810 may be shown.

According to some embodiments, the management module 420 may measure a voltage, a current, a temperature, or the like from a battery pack 410, and may estimate SOC, SOH, or the like and may generate the battery state information 810. According to some embodiments, the SOC or SOH may be estimated by the second computing system 302 instead of the management module 420.

On the basis of the battery state information 810, the second computing system 302 may perform the priority adjustment 830 regarding a calculation, which has a priority, from among the first calculation related to driving control and the second calculation related to energy management, or the priority ratio adjustment 850 regarding a ratio between the first calculation and the second calculation to be simultaneously performed.

According to some embodiments, the battery state information 810 may include battery temperature information. When battery overheating according to the battery temperature information does not occur, the at least one processor 320 of the second computing system 302 may determine a processing priority such that the first calculation takes precedence over the second calculation. When the battery overheating occurs, the at least one processor 320 of the second computing system 302 may determine that the first calculation and the second calculation have the same processing priority as each other.

It may be determined whether the battery overheating occurs, based on whether an average temperature of the battery 400 according to the battery temperature information exceeds a predetermined threshold temperature during a specific period, such as 10 seconds, 15 seconds, 30 seconds, 1 minute, 3 minutes, or the like. Another representative value such as the median value may be used instead of an average value.

When the battery overheating occurs, the second computing system 302 may need to process the second calculation for energy management instead of the management module 420. Accordingly, the priority of the second calculation may be set to be relatively high. On the other hand, when the battery overheating does not occur, the first calculation may take precedence over the second calculation. According to some embodiments, the fact that the first calculation has the same priority as the second calculation may mean that the second computing system 302 processes calculations depending on the order of occurrence without distinction between the first calculation and the second calculation. According to some embodiments, when the battery overheating occurs, a processing priority may be determined such that the second calculation takes precedence over the first calculation.

According to some embodiments, a warning about thermal runaway of the battery 400 may be performed step by step based on the battery temperature information. The thermal runaway may occur due to mechanical abnormalities, electrical abnormalities, or thermal abnormalities of the battery 400 or an internal short circuit, and may lead to a fire in the vehicle 10. When a precursor symptom of thermal runaway is detected through the battery state information 810 in addition to the battery temperature information, the second computing system 302 may reduce or stop using the battery 400. To this end, at least part of driving functions of the vehicle 10 may be restricted by using the driving control software 350. For example, a driving assistance function, a vehicle speed, an air conditioner, a display, a sport driving mode, or the like may be restricted for each stage of thermal runaway risks.

According to some embodiments, when the temperature of the battery 400 exceeds a threshold temperature such as 40° C., 45° C., 50° C., 55° C., or 60° C., the energy management software 360 of the second computing system 302 or the management module 420 may perform derating control for the battery 400. According to some embodiments, when the derating control is performed, the second computing system 302 may set a processing priority or processing priority ratio of the second calculation to the first calculation to be high.

According to some embodiments, the at least one processor 320 of the second computing system 302 may be configured to determine a processing priority based on a periodic, such as hourly, reception amount of the battery state information 810 and a periodic, such as hourly, throughput of the second calculation. For example, when the hourly reception amount (reception speed) of the battery state information 810 provided from the management module 420 exceeds a threshold reception amount, it may be expected that the time required to process the battery state information 810 in the second computing system 302 increases, and thus the processing priority may be determined such that the first calculation does not take precedence over the second calculation. In the meantime, the throughput (processing speed) of the second calculation may vary depending on the complexity of the battery state information 810. When the throughput of the second calculation exceeds a threshold throughput, the processing priority may be determined such that the first calculation does not take precedence over the second calculation.

According to some embodiments, the at least one processor 320 of the second computing system 302 may determine whether a priority event of driving control occurs, based on driving information related to driving of the vehicle 10. When it is determined that the priority event occurs, the at least one processor 320 of the second computing system 302 may be configured to process a calculation corresponding to the priority event, and then to process the first calculation and the second calculation depending on the processing priority.

For example, in the case where an abnormality is detected in the driving information, when it is determined that it is necessary to perform driving control before energy management because the reception amount and throughput of the driving information increase excessively, or when the vehicle 10 is expected to pass a place having high driving difficulty, it may be determined that a priority event of driving control occurs. When the priority event occurs, the calculation corresponding to the priority event may be processed preferentially. Afterward, the first calculation and the second calculation may be processed again depending on the processing priority.

Figure 9:
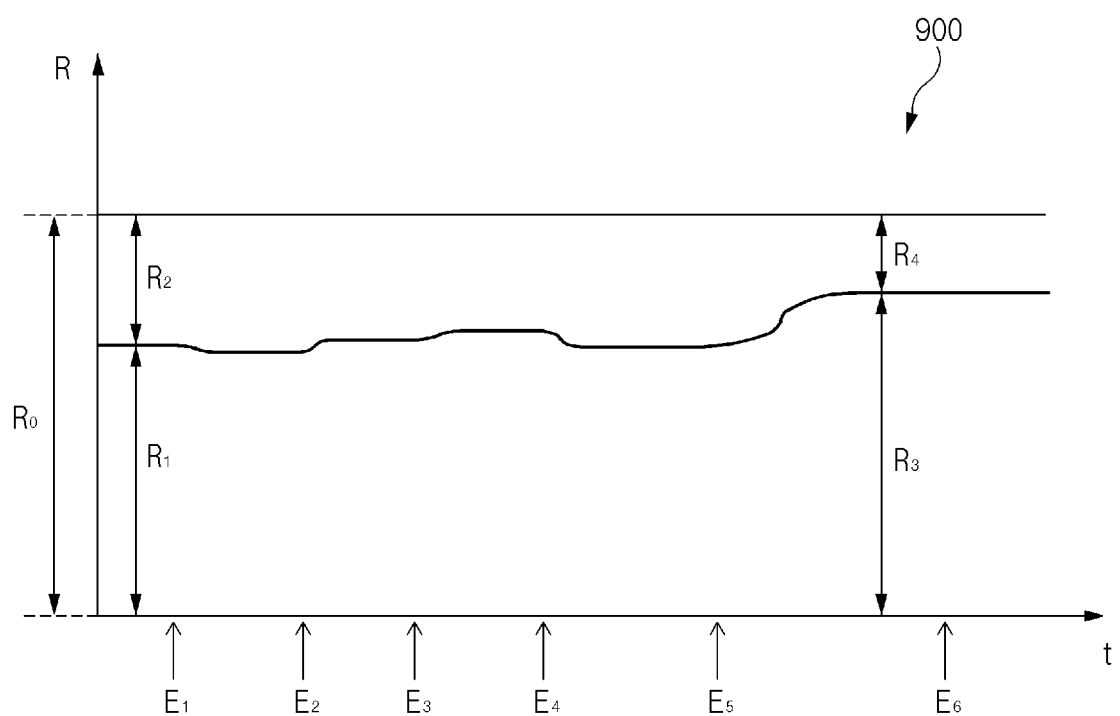
FIG. 9 is a diagram illustrating a process of calculating a processing priority ratio in a second computing system, according to some embodiments disclosed herein.

FIG. 9 is a diagram illustrating a process of calculating a processing priority ratio in a second computing system, according to some embodiments disclosed herein.

Referring to FIG. 9, a graph 900 illustrating a process of calculating a processing priority ratio in the second computing system 302 may be shown. The graph 900 may indicate a distribution structure of calculation resources 'R' over time 't'.

According to some embodiments, the at least one processor 320 of the second computing system 302 may be configured to calculate a calculation priority ratio of a second calculation to a first calculation based on battery state information, and to simultaneously process the first calculation and the second calculation by distributing calculation resources based on the calculation priority ratio.

In the graph 900, calculation resources $R_0$ may mean the total sum of calculation resources of the second computing system 302. The calculation resources $R_0$ may be distributed to a first resource $R_1$ for processing the first calculation related to driving control and a second resource $R_2$ for processing the second calculation related to energy management. According to some embodiments, whenever events $E_1, \ldots, E_5$ related to driving or battery of the vehicle 10 occur, the distribution of the calculation resources $R_0$ may vary.

According to some embodiments, the at least one processor 320 of the second computing system 302 may determine whether a priority event of driving control occurs, based on driving information related to driving of the vehicle 10. When it is determined that the priority event occurs, the at least one processor 320 of the second computing system 302 may be configured to set an upper priority ratio value based on characteristics of a priority event and to calculate the calculation priority ratio again in consideration of the upper priority ratio value.

According to some embodiments, in the graph 900, an event $E_5$ may be a priority event of driving control. For example, the priority event may include a situation where the number and types of surrounding objects of the vehicle 10, and movements of surrounding objects of the vehicle 10 are greatly complicated, a situation where the amount of longitudinal control for acceleration/deceleration of the vehicle 10 and the amount of lateral control for heading/steering of the vehicle 10 are greatly increased, or a situation where a large amount of calculation is required by providing limited driving information due to bad weather. The upper priority ratio value may be set to $R_4/R_0$. Accordingly, after the event $E_5$, even though weight $R_4/R^0$ of the second calculation is increased, and the event $E_6$ that needs to decrease weight $R_3/R_0$ of the first calculation occurs, a ratio ($R_3$:$R_4$) between the first calculation and the second calculation may not change because the upper priority ratio value is limited.

According to some embodiments, the at least one processor 320 of the second computing system 302 may be configured to deliver at least part of the second calculation to the management module 420 of the battery 400 when the calculation priority ratio is set to be greater than or equal to the priority ratio reference value, and to process all of the second calculation based on the calculation result for at least part of the second calculation provided from the management module 420.

The priority ratio reference value may be preset to a numerical value such as 1.0%, 2.0%, 5.0%, or 10.0%. In a situation such as battery thermal runaway as described herein, when the calculation priority ratio of the second calculation to the first calculation is greater than or equal to a priority ratio reference value, a smooth operation of the driving control software 350 of the second computing system 302 may be affected. As such, to prevent the driving control of the vehicle 10 from being affected, the calculation resource of the management module 420 of the battery 400 may be utilized. The result for at least part of the second calculation processed by the management module 420 may be delivered to the second computing system 302, and the second calculation may be completed based on the result.

Figure 10:
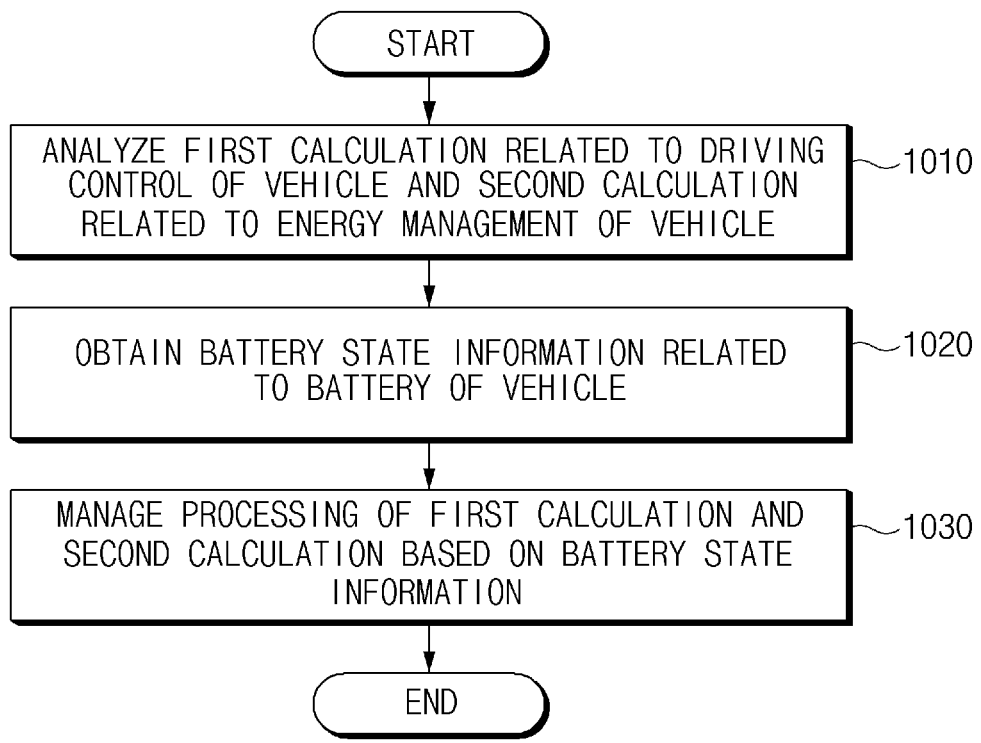
FIG. 10 is a diagram illustrating operations constituting an operating method of a second computing system, according to some embodiments disclosed herein.

FIG. 10 is a diagram illustrating operations constituting an operating method of a second computing system, according to some embodiments disclosed herein.

Referring to FIG. 10, an operating method 1000 of the second computing system 302 may include operation 1010 to operation 1030. However, other embodiments are not limited thereto, and it is possible to omit some operations or add general-purpose operations. The operations of the operating method 1000 may be performed in a different order than the shown order.

Operation 1010 to operation 1030 of the operating method 1000 may be performed by the at least one processor 320 operatively coupled to the interface circuit 310. The operating method 1000 of the second computing system 302 may include operations processed in time series in the second computing system 302. Accordingly, even when contents are omitted, descriptions of the second computing system 302 may be identically applied to the operating method 1000.

In operation 1010, the second computing system 302 may analyze a first calculation related to driving control of a vehicle and a second calculation related to energy management of a vehicle. In operation 1020, the second computing system 302 may obtain battery state information related to a battery of the vehicle. In operation 1030, the second computing system 302 may manage the processing of a first calculation and a second calculation based on battery state information.

According to some embodiments, the operating method 1000 of the second computing system 302 may be implemented in a form of a computer program stored in a computer-readable storage medium. That is, the computer program may include instructions for implementing the operating method 1000 of the second computing system 302, and the instructions of the program may be stored in a computer-readable storage medium. The computer program may include a mobile application.

For example, the computer-readable storage medium may include a hardware system, which is specially configured to store and execute computer program instructions, such as magnetic media (e.g., a hard disk, a floppy disk, or a magnetic tape), optical media (e.g., CD-ROM and DVD), magneto-optical media (e.g., a floptical disk), read only memories (ROMs), random access memories (RAMs), and flash memories. Also, the computer program instructions may include not only a mechanical code such generated by a compiler but also a high-level language code executable on a computer by using an interpreter.

Figure 11:
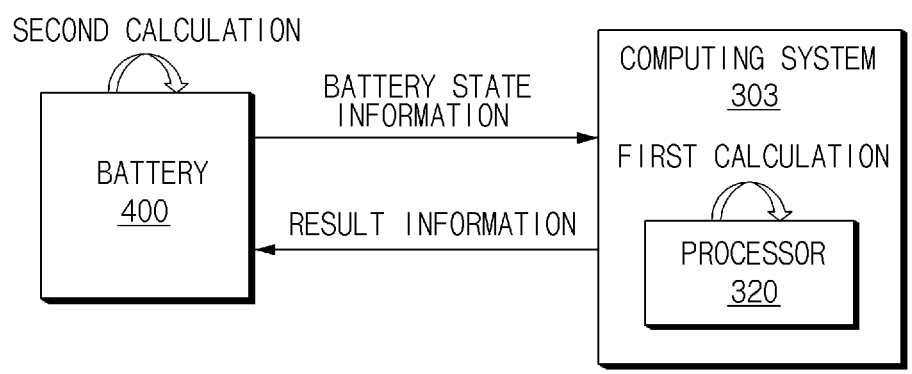
FIG. 11 is a diagram illustrating a third computing system, according to some embodiments disclosed herein.

FIG. 11 is a diagram illustrating a third computing system, according to some embodiments disclosed herein.

Referring to FIG. 11, a method in which a third computing system 303 within the vehicle 10 distributes battery-related calculations into a first calculation processed by the third computing system 303 and a second calculation processed by the battery 400 based on the battery state information provided by the battery 400 may be shown. According to some embodiments, the third computing system 303 may correspond to an autonomous driving platform.

According to some embodiments, the third computing system 303 may include an interface circuit 310 and at least one processor 320 operatively coupled to the interface circuit 310. However, other embodiments are not limited thereto. Some elements may be omitted from the third computing system 303 or other general-purpose elements may be further included in the third computing system 303.

Hereafter, functions and/or operations performed by the at least one processor 320 may be interpreted as being performed by the third computing system 303 in the vehicle 10.

The at least one processor 320 of the third computing system 303 may be configured to obtain battery state information related to a state of the battery 400 from the battery 400 of the vehicle 10. According to some embodiments, the battery state information may include voltage information, current information, temperature information, SOC information, SOH information, an accumulated charge current amount, an accumulated discharge current amount, an accumulated charge power amount, an accumulated discharge power amount, insulation resistance, a relay state, and a combination thereof.

The at least one processor 320 of the third computing system 303 may be configured to at least partially process a calculation related to energy management of the vehicle 10 by using the battery state information. According to some embodiments, the energy management may include management functions such as battery state measurement, battery remaining capacity estimation, battery life estimation, battery cell balancing, or the like. At least part of a calculation corresponding to each management function may be performed by the third computing system 303.

The at least one processor 320 of the third computing system 303 may be configured to provide the battery 400 with result information obtained by processing the calculation. At least part of the calculation related to energy management may be processed by the third computing system 303. When the result is provided to the battery 400, the other parts for completing the calculation may be processed by the management module 420 of the battery 400.

According to some embodiments, the calculation related to energy management may include a first calculation processed at least partially by the at least one processor 320 and a second calculation processed at the battery 400. According to some embodiments, the energy-related calculation may be divided into the first calculation and the second calculation. The first calculation may be processed by the third computing system 303, and the second calculation may be processed by the management module 420 of the battery 400. Because the third computing system 303 having high calculation processing capability in such the manner may be involved in the energy-related calculation, the energy management of the vehicle 10 may be performed stably.

Figure 12:
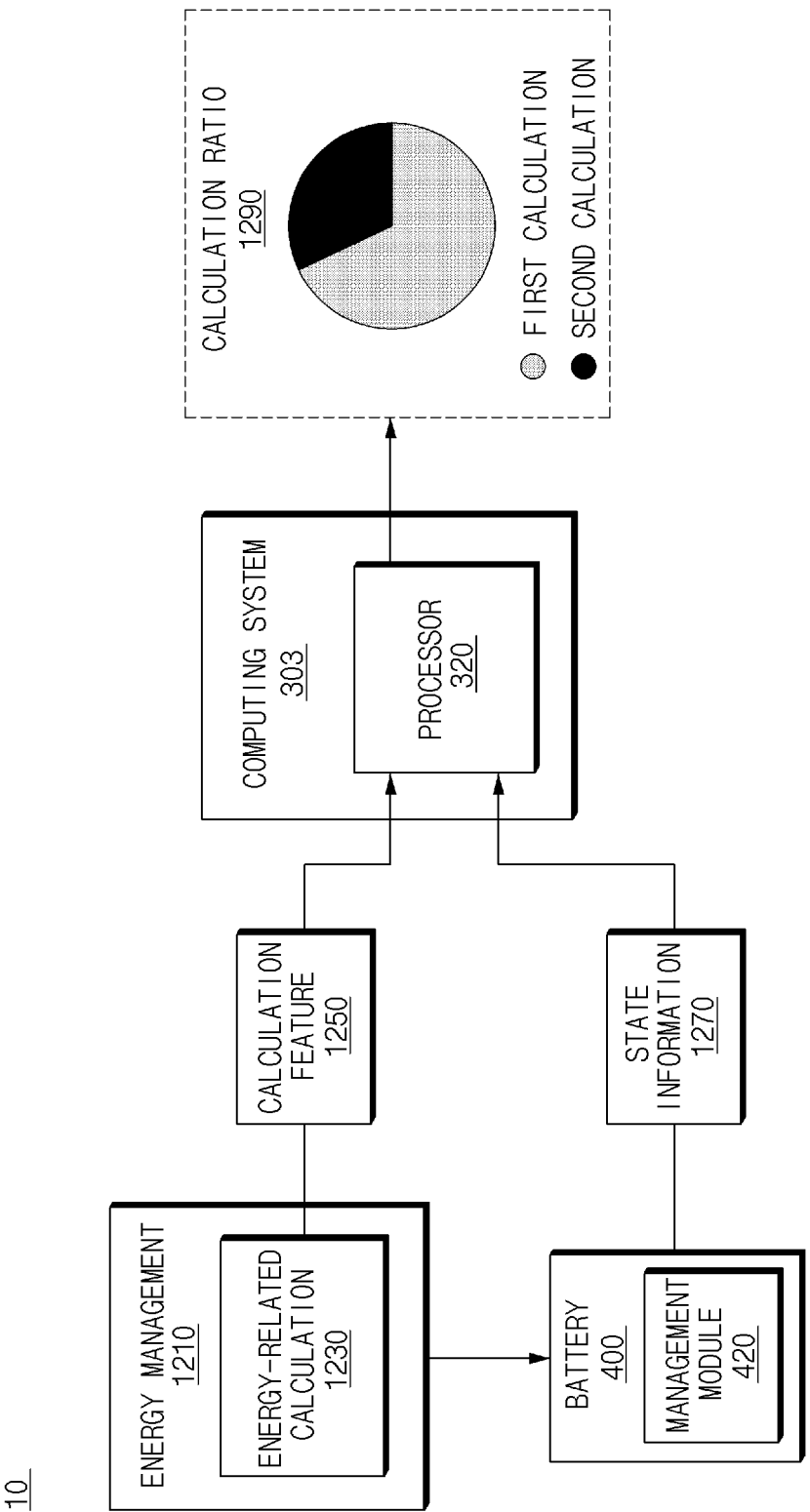
FIG. 12 is a diagram illustrating a method of calculating a ratio between a first calculation and a second calculation in a third computing system, according to some embodiments disclosed herein.

FIG. 12 is a diagram illustrating a method of calculating a ratio between a first calculation and a second calculation in a third computing system, according to some embodiments disclosed herein.

Referring to FIG. 12, a method in which the third computing system 303 adjusts a calculation ratio 1290 in the vehicle 10 based on a feature 1250 of a calculation related to energy management and battery state information 1270 of the battery 400 may be shown.

In the vehicle 10, energy management 1210 may be performed on the battery 400. According to some embodiments, the energy management 1210 may include battery state measurement, remaining battery capacity estimation, battery life estimation, battery cell balancing, and the like. The energy management 1210 may be achieved by an energy-related calculation 1230, and the energy-related calculation 1230 may have the calculation feature 1250 depending on the amount or type of calculation. In the meantime, the battery 400 may have the battery state information 1270 such as a voltage, a current, a temperature, SOC, SOH, an accumulated charge amount, and an accumulated discharge amount.

According to some embodiments, the at least one processor 320 of the third computing system 303 may be configured to adjust a ratio between a first calculation and a second calculation based on the feature 1250 of the calculation related to energy management and the battery state information 1270. The adjusting of the calculation ratio 1290 of the first calculation and the second calculation may mean adjusting the ratio for distributing the energy-related calculation 1230 to the third computing system 303 and the management module 420 of the battery 400.

The calculation ratio 1290 may be adjusted based on the calculation feature 1250 and the battery state information 1270. For example, when the amount or complexity of calculation is high as in a case where an energy-related calculation 1230 has a multi-step calculation procedure, a larger amount of calculation may be allocated to the third computing system 303 than to the management module 420. Moreover, even when the battery state information 1270 has a complex pattern or large data variability, a larger amount of calculation may be allocated to the third computing system 303 than to the management module 420.

According to some embodiments, the management module 420 may collect the battery state information 1270 and may transmit the battery state information 1270 to the third computing system 303. The third computing system 303 processes all of the energy-related calculation 1230 by using the battery state information 1270 and then may return the calculation result to the management module 420. According to some embodiments, the energy-related calculation 1230 may be performed by the driving control software 350 and/or the energy management software 360 of the third computing system 303.

According to some embodiments, the battery state information 1270 may include driving SOC information indicating a SOC range in which the vehicle 10 has been driving, and may include driving temperature information for a similar purpose. Furthermore, the battery state information 1270 may further include charging current information, SOC/DOD information used in last 16 cycles, accumulated energy amount per distance, and the like. In this regard, a complex pattern of the battery state information may refer to a pattern of charging current amounts, SOC/DOD, accumulated energy, and the like, having a profile over several cycles that does not match or neatly compare with typical profiles of battery state information from similar batteries, such as battery state information acquired from a training data set When the calculation 1230 related to energy management has a feature involved in driving control of the vehicle 10, the at least one processor 320 of the third computing system 303 may be configured to increase a weight of the first calculation to the second calculation. For example, when regenerative braking of the vehicle 10 is performed, the remaining amount of the battery 400 may affect whether the regenerative braking is possible, and thus the energy-related calculation 1230 may be involved in driving control. As such, when the energy-related calculation 1230 affects the driving control, the weight of a first calculation processed with high calculation capability for smooth driving control may be increased.

According to some embodiments, when the battery 400 has limited chargeable power due to regenerative braking, the management module 420 may inform the third computing system 303 that the battery 400 has limited chargeable power, and thus the driving control software 350 of the third computing system 303 may adjust the level of regenerative braking. When the level of regenerative braking is adjusted, the charging amount and braking force may be changed.

According to some embodiments, the battery state information 1270 may include temperature information. The at least one processor 320 of the third computing system 303 may be configured to increase a weight of the first calculation to the second calculation when a battery temperature according to the temperature information is not less than a threshold temperature. For example, when the battery temperature exceeds the threshold temperature such as 40° C., 45° C., 50° C., 55° C., or 60° C., the battery temperature may return to a normal range. The weight of the second calculation processed by the management module 420 may be reduced to prevent battery thermal runaway. In some examples, the weight of the second calculation processed by the management module 420 may be iteratively reduced until the battery temperature does not exceed the threshold temperature so that a risk of battery thermal runaway is avoided.

According to some embodiments, the management module 420 may perform cooling control and/or heating control for adjusting the temperature of the battery pack 410 of the battery 400. In this case, the management module 420 may inform the third computing system 303 of a situation of controlling temperature adjustment.

In response to the situation of controlling temperature adjustment, the energy management software 360 of the third computing system 303 may predict a change in battery temperature according to the temperature adjustment control, and may reflect the predicted result to a processing of the first calculation later.

According to some embodiments, the at least one processor 320 of the third computing system 303 may be further configured to obtain driving information related to driving of the vehicle 10. The at least one processor 320 of the third computing system 303 may be configured to adjust a ratio by additionally considering the driving information. For example, considering additional driving information such as a current speed of the vehicle 10 and movements of surrounding objects, a situation in which it is difficult to allocate calculation resources of the third computing system 303 to the energy-related calculation 1230 may occur. Accordingly, when the calculation resource for driving control is expected to increase, the calculation load of the management module 420 may increase.

According to some embodiments, the at least one processor 320 of the third computing system 303 may be configured to generate estimation state information by estimating the state of the battery 400 based on the driving information and to process a first calculation by using the estimation state information. For example, the battery state information 1270 may be information directly measured from the battery 400 by the management module 420. On the other hand, the estimation state information may be estimated in consideration of a driving distance, a driving speed, and fuel efficiency of the vehicle 10. When using estimation state information, the third computing system 303 may seamlessly process the first calculation even when the battery state information 1270 is temporarily unavailable.

According to some embodiments, the energy management software 360 of the third computing system 303 may generate the estimation state information based on the driving information and may correct an error by comparing the estimation state information with the battery state information 1270 directly measured from the battery 400. Afterward, the error-corrected estimation state information may be used for control of the energy-related calculation 1230 or the battery pack 410.

According to some embodiments, the at least one processor 320 of the third computing system 303 may be configured to generate the estimation state information based on the driving information through a state estimation model and to update the state estimation model by comparing the estimation state information with the battery state information 1270 actually measured from the battery 400. For example, a state estimation model may be updated to reduce an error between the estimation state information and the battery state information 1270. According to some embodiments, the state estimation model may be an AI model that is trained and updated through various machine learning techniques based on a neural network structure. When model parameters are optimized through continuous updates, the state estimation model may generate estimation state information that is substantially the same as the battery state information 1270 actually measured from the battery 400.

According to some embodiments, the energy management software 360 of the third computing system 303 and the management module 420 of the battery 400 may divide and process the energy-related calculation 1230 step by step. For example, the energy management software 360 may calculate SOC and/or SOH based on a voltage, a current, or temperature data of the battery 400. The management module 420 may perform a control operation such as cell balancing based on SOC and/or SOH and may provide the energy management software 360 with result data of the control operation again. The energy management software 360 may re-calculate SOC and/or SOH based on the result data or may perform other management functions.

Figure 13:
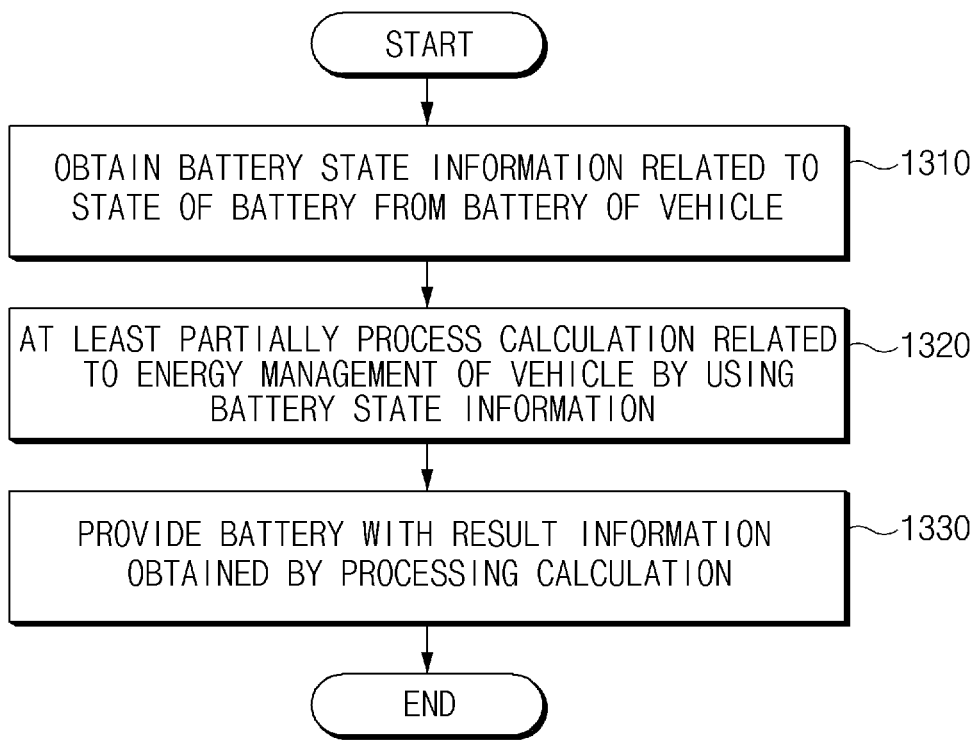
FIG. 13 is a diagram illustrating operations constituting an operating method of a third computing system, according to some embodiments disclosed herein.

FIG. 13 is a diagram illustrating operations constituting an operating method of a third computing system, according to some embodiments disclosed herein.

Referring to FIG. 13, an operating method 1300 of the third computing system 303 may include operation 1310 to operation 1330. However, other embodiments are not limited thereto, and it is possible to omit some operations or add general-purpose operations. The operations of the operating method 1300 may be performed in a different order than the shown order.

Operation 1310 to operation 1330 of the operating method 1300 may be performed by the at least one processor 320 operatively coupled to the interface circuit 310. The operating method 1300 of the third computing system 303 may include operations processed in time series in the third computing system 303. Accordingly, even when contents are omitted, descriptions of the third computing system 303 may be identically applied to the operating method 1300.

In operation 1310, the third computing system 303 may obtain battery state information related to a state of a battery from the battery of a vehicle. In operation 1320, the third computing system 303 may at least partially process a calculation related to energy management of the vehicle by using the battery state information. In operation 1330, the third computing system 303 may provide the battery with result information obtained by processing the calculation.

According to some embodiments, the operating method 1300 of the third computing system 303 may be implemented in a form of a computer program stored in a computer-readable storage medium. That is, the computer program may include instructions for implementing the operating method 1300 of the third computing system 303, and the instructions of the program may be stored in a computer-readable storage medium. The computer program may include a mobile application.

For example, the computer-readable storage medium may include a hardware system, which is specially configured to store and execute computer program instructions, such as magnetic media (e.g., a hard disk, a floppy disk, or a magnetic tape), optical media (e.g., CD-ROM and DVD), magneto-optical media (e.g., a floptical disk), read only memories (ROMs), random access memories (RAMs), and flash memories. Also, the computer program instructions may include not only a mechanical code such generated by a compiler but also a high-level language code executable on a computer by using an interpreter.

The terms such as "comprise", "include", and "have" described herein mean that the corresponding component may be included, unless there is a particularly contrary statement, and should be interpreted as further including another component, not excluding another component. Unless otherwise defined herein, all the terms used herein, which include technical or scientific terms, may have the same meaning that is generally understood by a person skilled in the art to which embodiments disclosed herein pertain. Terms commonly used, such as those defined in the dictionary, should be interpreted as having a meaning that is consistent with the meaning in the context of the related art and will not be interpreted as having an idealized or overly formal meaning unless expressly defined herein.

The descriptions herein are merely illustrative of the disclosed technical ideas, and various modifications and variations may be made by one skilled in the art, to which the embodiments disclosed herein belong, without departing from the essential characteristic of the embodiments disclosed herein. Therefore, embodiments disclosed herein are intended not to limit but to explain the technical idea of embodiments disclosed herein, and the scope of the technical idea disclosed herein is not limited by this embodiment. The scope of protection disclosed herein should be construed by the attached claims, and all equivalents thereof should be construed as being included within the scope of the present disclosure.

In some examples of the disclosure, the at least one processor of the computing system within the vehicle may be implemented as a system-on-a-chip. In this regard, the chip may provide all or some onboard computing capabilities of the autonomous driving platform. For example, calculations relating to driving control and energy management may be performed using a single chip included in the vehicle. In such an example, the calculation resources distributed between the driving control and energy management functions may refer to the calculation resources available at the chip. Also, in such an example, the interface circuit may be a signal pin or other type of interface port on the chip.

[Explanation of Reference Numerals]

| | |
|---|---|
| 1: vehicle management system | 10: vehicle |
| 20: network | 30: data management server |
| 100: communication module | 200: sensor module |
| 300: computing system | 400: battery |
| 500: driving system | 310: interface circuit |
| 320: at least one processor | 410: battery pack |
| 420: management module | 350: driving control software |
| 360: energy management software | |

The invention claimed is:

1. An autonomous driving platform, comprising:
at least one processor operatively coupled to a plurality of sensors and a battery of a vehicle, the at least one processor utilizing calculation resources to perform at least a first calculation related to driving control of the vehicle and a second calculation related to energy management of the vehicle, wherein the at least one processor is configured to:
obtain driving information related to driving of the vehicle from the plurality of sensors; and
determine a processing priority indicating whether the first calculation has a higher priority than the second calculation or the second calculation has a higher priority than the first calculation based on the driving information; and
manage an allocation of the calculation resources for performing the first calculation and the second calculation based on the determined processing priority.

2. The autonomous driving platform of claim 1, wherein one or both of the at least one processor and the calculation resources are included in the vehicle.

3. The autonomous driving platform of claim 1, wherein the driving information includes vehicle information related to a state of operation of the vehicle and object information related to surrounding objects of the vehicle, and
wherein the at least one processor is configured to:
in response to at least one of overload of the vehicle information or overload of the object information, determine the processing priority such that the first calculation has priority over the second calculation; and
in response to an amount of the vehicle information exceeding a threshold amount and an amount of the object information not exceeding the threshold amount, determine the processing priority such that the first calculation and the second calculation have the same priority as each other.

4. The autonomous driving platform of claim 1, wherein the driving information includes vehicle information related to a state of control of the vehicle, wherein the state of control includes at least a first state of lateral control corresponding to steering the vehicle and a second state of longitudinal control corresponding to acceleration and deceleration of the vehicle.

5. The autonomous driving platform of claim 4, wherein the at least one processor is configured to:

in response to the vehicle being in the first state of lateral control, determine the processing priority such that the first calculation is given a first level of priority;
in response to the vehicle being in the second state of longitudinal control, determine the processing priority such that the first calculation is given a second level of priority lower than the first level of priority; and
in response to the vehicle being in both the first state of lateral control and the second state of longitudinal control, determine the processing priority such that calculation resources are allocated to only the first calculation.

6. The autonomous driving platform of claim 5, wherein the at least one processor is configured to, in response to the vehicle being in both the first state of lateral control and the second state of longitudinal control, instruct a data management server operatively connected to the vehicle over a network to perform the second calculation.

7. The autonomous driving platform of claim 1, wherein the processing priority is based on a reception amount of the driving information over a predetermined period of time and a throughput of the first calculation over the predetermined period of time.

8. The autonomous driving platform of claim 1, wherein allocation of the calculation resources comprises giving priority to the second calculation over the first calculation in response to an empty fuel tank of the vehicle, a destination of the vehicle being set to a charging station, a route of the vehicle being determined at the start of driving, or availability of a driving control software update.

9. The autonomous driving platform of claim 3, wherein the at least one processor is configured to:
obtain battery state information related to the battery of the vehicle;
determine occurrence of an energy management priority event based on the battery state information; and
in response to the energy management priority event, determine the processing priority of the first calculation and the second calculation based on the energy management priority event.

10. The autonomous driving platform of claim 9, wherein the energy management priority event is one of an abnormal state of the battery state information, or a low battery level of the battery.

11. The autonomous driving platform of claim 1, wherein allocation of the calculation resources comprises determination of a calculation priority ratio of the first calculation to the second calculation based on the driving information,
wherein the calculation priority ratio allocates respective portions of the calculation resources to each of the first calculation and the second calculation.

12. The autonomous driving platform of claim 11, wherein the at least one processor is configured to:
obtain battery state information related to the battery of the vehicle;
determine occurrence of an energy management priority event based on the battery state information;
in response to the energy management priority event, set the calculation priority ratio to an upper priority ratio value that prioritizes the second calculation over the first calculation by a predetermined maximum amount.

13. The autonomous driving platform of claim 11, wherein the at least one processor is configured to:
in response to the calculation priority ratio being less than a priority ratio reference value, allocate at least a portion of the second calculation to a battery management system of the battery;

receive a partial second calculation result from the battery management system for the portion of the second calculation; and process the second calculation based on the partial second calculation result received from the battery management system.

14. The autonomous driving platform of claim 13, further comprising the battery, the battery comprising the battery management system, the battery management system configured to perform the at least a portion of the second calculation and deliver the partial second calculation result to the at least one processor.

15. The autonomous driving platform of claim 13, wherein the battery management system is operated at least in part remotely such that at least some of the partial second calculation result is received from the remote portion of the battery management system.

16. The autonomous driving platform of claim 11, wherein first calculation and the second calculation are performed in parallel.

17. The autonomous driving platform of claim 1, wherein allocation of the calculation resources comprises determination of an order of the first calculation and the second calculation based on the driving information, wherein the order determines to which of the first calculation to the second calculation the calculation resources perform first.

18. The autonomous driving platform of claim 1, wherein the at least one processor and calculation resources are included in a system-on-a-chip, and wherein the autonomous driving platform further comprises an interface circuit configured to operatively interconnect the at least one processor to one or more of the plurality of sensors of the vehicle.

19. The autonomous driving platform of claim 18, wherein the system-on-a-chip includes only one processing chip.

20. The autonomous driving platform of claim 1, wherein the driving information indicates at least one of a steering movement, an acceleration movement, or a deceleration movement of the vehicle.

* * * * *